United States Patent
Takita et al.

(10) Patent No.: US 7,308,168 B2
(45) Date of Patent: Dec. 11, 2007

(54) OPTICAL SWITCH APPARATUS AND CONTROL INFORMATION UPDATING METHOD THEREIN

(75) Inventors: Yutaka Takita, Kawasaki (JP); Yutaka Kai, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 11/194,565

(22) Filed: Aug. 2, 2005

(65) Prior Publication Data
US 2006/0222289 A1 Oct. 5, 2006

(30) Foreign Application Priority Data
Mar. 31, 2005 (JP) ............... 2005-102763

(51) Int. Cl.
*G02B 6/35* (2006.01)
(52) U.S. Cl. ............................................. 385/17; 385/8
(58) Field of Classification Search ............... None
See application file for complete search history.

(56) References Cited

U.S. PATENT DOCUMENTS

| | | | |
|---|---|---|---|
| 5,239,598 A | 8/1993 | Wight et al. | 385/8 |
| 5,663,820 A | 9/1997 | Shiragaki | |
| 5,974,216 A | 10/1999 | Nakaya | 385/140 |
| 6,411,430 B1 | 6/2002 | Ogino et al. | 359/337.11 |
| 6,975,782 B2 * | 12/2005 | Maki et al. | 385/8 |
| 2002/0114556 A1 | 8/2002 | Kato et al. | 385/16 |
| 2004/0076357 A1 | 4/2004 | Maki et al. | 385/8 |

FOREIGN PATENT DOCUMENTS

| | | |
|---|---|---|
| JP | 7-212315 | 8/1995 |
| JP | 10-228007 | 8/1998 |
| JP | 2000-114629 | 4/2000 |
| JP | 2000-269892 | 9/2000 |
| JP | 2002-318398 | 10/2002 |
| JP | 2003-185984 | 7/2003 |

(Continued)

OTHER PUBLICATIONS

European Search Report dated Jul. 27, 2006 for corresponding European Patent Application No. 05017504.1.

(Continued)

*Primary Examiner*—Tina M. Wong
(74) *Attorney, Agent, or Firm*—Staas & Halsey LLP

(57) ABSTRACT

The present invention relates to an optical switch apparatus made to successively carry out the route switching with respect to frame signal light inputted through various paths while eliminating the dispersion of an output power value. In the optical switch apparatus, input side deflecting units are disposed in corresponding relation to a plurality of input ports and output side deflecting units are disposed in corresponding relation to a plurality of output ports. Each input side deflecting unit and each output side deflecting unit are constructed in a manner such that a plurality of optical deflecting elements made to deflect signal light in response to an electric field applied are arranged in a cascade fashion, and the optical deflecting element constituting the input side deflecting unit or the output side deflecting unit is made so as to variably adjust the level of signal light to be outputted from the output side deflecting unit to the output port.

21 Claims, 16 Drawing Sheets

FOREIGN PATENT DOCUMENTS

| | | |
|---|---|---|
| JP | 2003-215516 | 7/2003 |
| JP | 2003-215517 | 7/2003 |
| JP | 2003-215520 | 7/2003 |
| JP | 2003-241153 | 8/2003 |
| JP | 2003-248205 | 9/2003 |
| JP | 2003-255287 | 9/2003 |
| JP | 2003-270597 | 9/2003 |
| JP | 2003-287727 | 10/2003 |

OTHER PUBLICATIONS

Communication from the State Intellectual Property Office of the People's Republic of China issued on May 18, 2007.

* cited by examiner

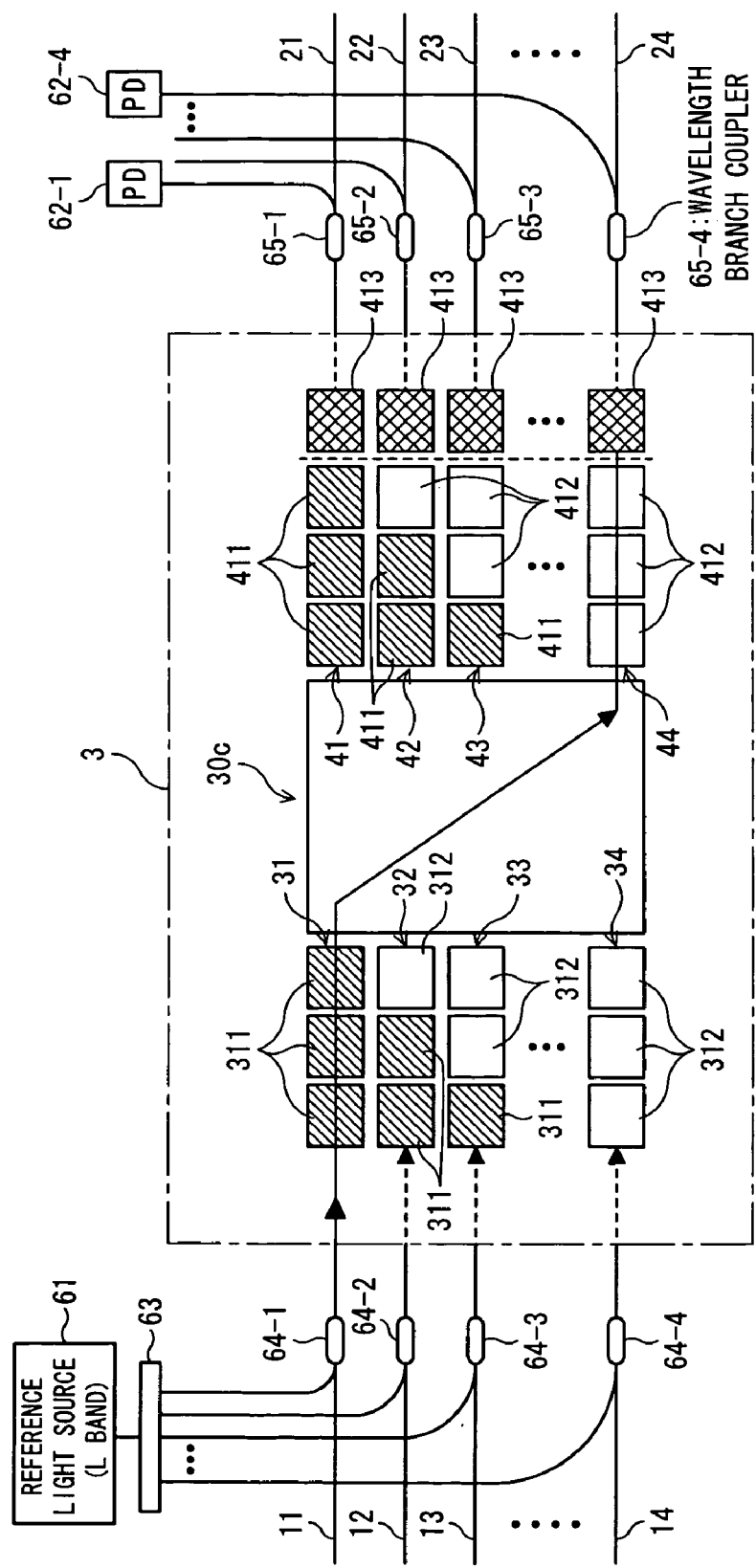

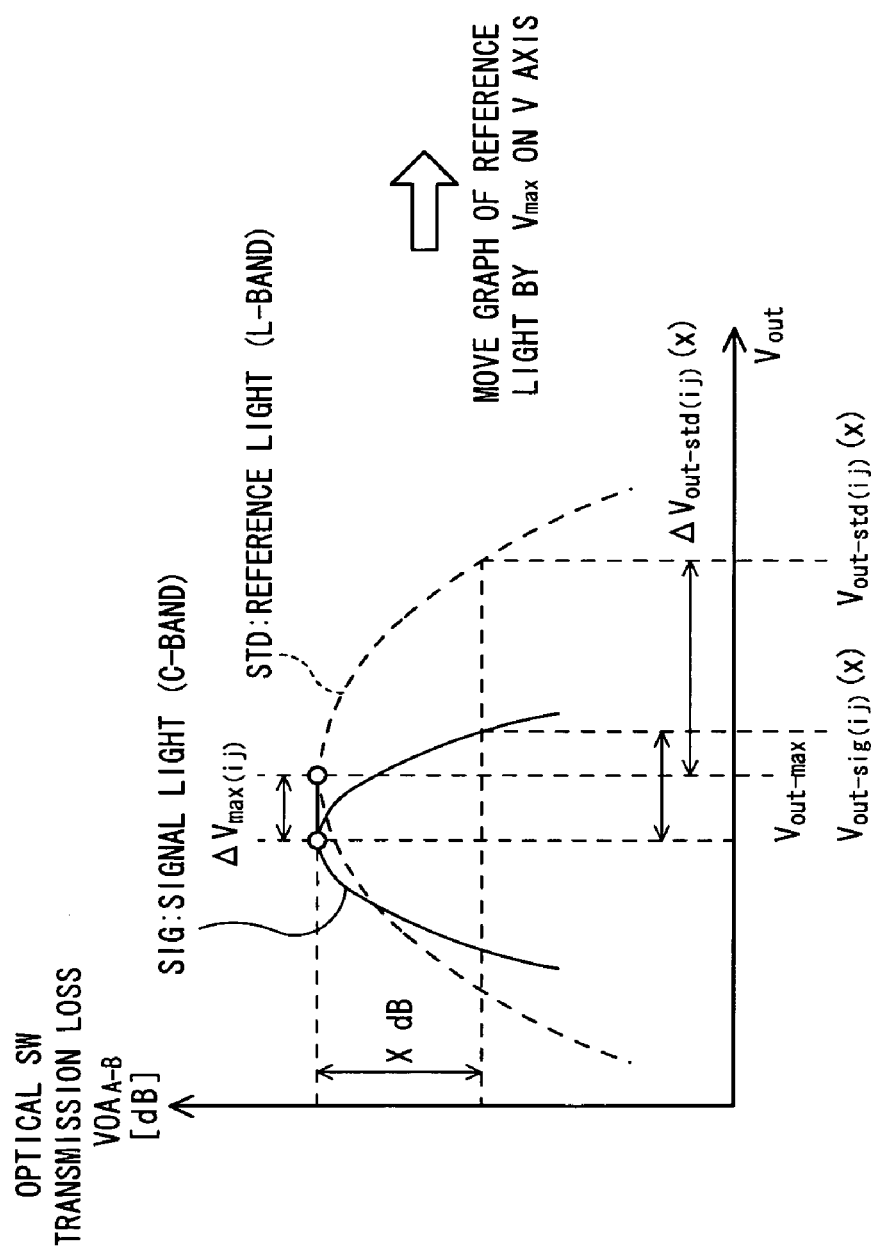
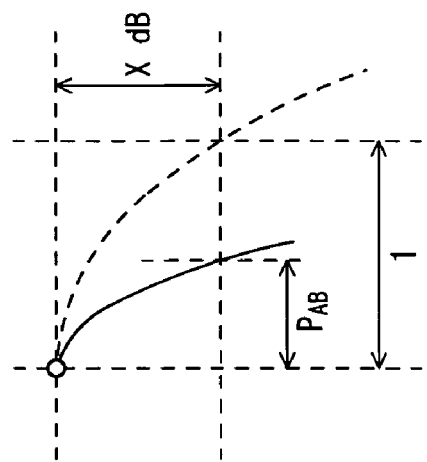
FIG. 12A
FIG. 12B

OPTICAL SWITCH APPARATUS AND CONTROL INFORMATION UPDATING METHOD THEREIN

BACKGROUND OF THE INVENTION

1) Field of the Invention

The present invention relates to an optical switch apparatus and a control information updating method therein, which are suitable for use in the construction of an optical communication system in which a large capacity of information modulated into an optical signal is handleable as an optical signal without being converted into an electric signal, and more particularly to an optical switch apparatus and a control information updating method therein suitable for use in a network which is made to conduct optical burst signal processing.

2) Description of the Related Art

In the case of a photonic network in a metro access area, a network configuration is frequently changed through the exchange/route-switching of a line or signal at ADM (Add Drop Multiplexing). At a repeating stage or the like in the current network, in large quantities there have been employed configurations which are designed to carry out the signal switching by once converting an optical signal into an electric signal and then making the conversion into an optical signal.

However, in the future, it is expectable that they are replaced with a dynamic OADM (Optical Add Drop Multiplexing) system made to separate only a desired wavelength in a state of an optical signal or an optical cross connect node or the like made to carry out the switching of an input/output route in units of wavelength in a state of an optical signal. Moreover, in the next generation, for the enhancement of line utilization efficiency, there will be a need to have a function to carry out processing (in this specification, these processing will be referred to generally as optical burst signal processing) in which an optical signal is divided into frames each having a fixed length so that the exchange/route-switching is made in units of frame in a state of the optical signal.

In such an optical burst signal processing handling transmission apparatus, it is expected to, for conducting the exchange or route-switching in units of the aforesaid frame, carry out the switching processing in a time dimension shorter than at least millisecond dimension.

A patent document 1 (Japanese Patent Laid-Open No. 2002-318398) discloses a technique related to an optical switch module using an optical deflecting element. For example, as shown in FIG. 15, there is described an optical switch module 100 comprising an input side (incidence side) optical waveguide unit 101, a collimating unit 102, an input side optical deflecting element unit 103, a common optical waveguide 104, an output side (outgoing side) optical deflecting element unit 105, an optical collecting unit 106 and an output side optical waveguide unit 107.

Each of the input side and output side optical waveguide units 101 and 107 has a plurality of optical waveguides 101*a* (#11 to #1*n*) or a plurality of optical waveguides 107*a* (#21 to #2*n*), and each of the input side and output side optical deflecting element units 103 and 105 has n optical deflecting elements 103*a* or 105*a*. Moreover, the optical deflecting element 103*a* or 105*a* is made to conduct the route switching with respect to a signal light inputted through the optical waveguide 101*a* for outputting it through a desired optical waveguide 107*a*.

As the other well-known techniques, there are techniques disclosed in Japanese Patent Laid-Open Nos. 2003-185984 (patent document 2), 2000-114629 (patent document 3), 2000-269892 (patent document 4), HEI 7-212315 (patent document 5) and HEI 10-228007 (patent document 6).

As mentioned above, in a case in which consideration is given to the switching processing in units of frame in a time dimension shorter than millisecond dimension, there is a need to successively carry out the route switching with respect to frame signal lights inputted through various paths. At this time, different output power values appear among frame signal lights to be outputted due to difference in input power, difference in loss between optical switch ports, or the like, which affects the error-free reception in an optical receiver.

The technique disclosed in the above-mentioned patent document 1 is remote from a configuration which can eliminate the difference in output power value among the frame signal lights.

As FIG. 16 shows, the patent document 2 discloses a technique in which, for varying the intensity of light inputted from an optical transmission line 211, an optical deflector 215 for making a different optical axis of an outputted light with respect to an optical axis of an optical transmission line 212 is disposed through lenses 213 and 214 between the optical transmission lines 211 and 212. However, a concrete control mode of varying the intensity of an inputted light is not disclosed by this optical deflector.

Although the patent documents 3 to 6 disclose a variable optical attenuator for feedbacking an attenuation quantity (value) of an outputted light for carrying out variable control, through such feedback control, difficulty is experienced in executing the control to make the output power value constant with respect to a frame signal light undergoing the switching processing in a time dimension shorter than a millisecond dimension. This is because the signal light passes at the time that the feedback control works.

In addition to the case of conducting the aforesaid optical burst signal processing, also in the case of common optical signal transmission, when difficulty is encountered in eliminating the fluctuation of optical power with a response in a time dimension (for example, microsecond dimension) shorter than milliseconds, it can interfere with the error-free reception as well as the above-mentioned case.

Moreover, in the technique disclosed in the aforesaid patent document 1, in a case in which, as shown in FIG. 15, with respect to a signal light from the input side optical waveguide 101*a* (#11 to #1*n*), the output route is switched to one of the n output side optical waveguide 107*a* (#21 to #2*n*), there is a need to apply a voltage corresponding to a deflection angle to each of the input side and output side optical deflecting elements 103*a* and 105*a*. Moreover, the deflection angles needed for the route switching functions in the input side and output side optical deflecting elements 103*a* and 105*a* vary in accordance with the disposition positions.

For example, in the optical deflecting element 103*a* for deflecting the light from the optical waveguide 101*a* (#11), there is a need to vary the light in a range from the angle of the straight-advancing direction of leading to the optical waveguide 107*a* (#21*n*) in the illustration to the right-side deflection angle of leading to the optical waveguide 107*a* (#2*n*) therein, while in the optical deflecting element 103*a* for deflecting the light from the optical waveguide 101*a* (#13), there is a need to vary the light in a range from the left-side deflection angle of leading to the optical waveguide 107*a* (#21) in the illustration to the right-side deflection angle of leading to the optical waveguide 107a (#2n) therein. This also applies to the output side optical deflecting elements 105a.

Therefore, there is a problem which arises with the route switching in that the maximum voltage to be supplied to each of the optical deflecting elements 103a and 105a varies in accordance with the disposition position, which complicates the voltage setting and the circuit arrangement for the supply of a voltage to the optical deflecting element 103a, 105a.

SUMMARY OF THE INVENTION

The present invention has been developed with a view to eliminating these problems, and it is therefore an object of the invention to successively carry out the route switching with respect to frame signal lights inputted through various paths while eliminating the dispersion of an output power value.

Another object of the present invention is to eliminate the fluctuation of optical power through a response in a time dimension shorter than millisecond.

A further object of the present invention is to make constant a maximum voltage to be applied to an optical deflecting element irrespective of its disposition position (arrangement position).

For these purpose, in accordance with an aspect of the present invention, there is provided an optical switch apparatus designed to deflect signal light from one of a plurality of input ports for switching and outputting to one of a plurality of output ports, wherein input side deflecting units made to deflect signal light from the input ports at an angle corresponding to a position of the output port forming an output destination are disposed in corresponding relation to the plurality of input ports, output side deflecting units made to deflecting the signal light from the input side deflecting units at an angle corresponding to a signal light guiding direction to the output ports and output them to the output ports are disposed in corresponding relation to the plurality of output ports, and each of the input side deflecting units and each of the output side deflecting units are constructed such that a plurality of optical deflecting elements each for deflecting signal light through the use of an electric field applied are arranged in a cascade fashion and an optical deflecting element constituting the input side deflecting unit or the output side deflecting unit is made to variably adjust a level of the signal light to be outputted from the output side deflecting unit to the output port.

Preferably, the optical switch apparatus further comprises a control information storing unit for storing control information for setting an optical route through which signal light propagates between one of the plurality of input ports and one of the plurality of output ports, a drive voltage control unit for making reference to the contents of the control information storing unit to output a control signal for controlling a drive voltage to be supplied to the optical deflecting elements constituting the input side deflecting units and the output side deflecting units in accordance with the optical route to be set and a power value of output signal light to be set, and a drive voltage supplying unit for supplying the drive voltage controlled by the control signal from the drive voltage control unit.

It is also appropriate that the control information storing unit includes a first loss characteristic storing unit for preserving a drive voltage to be supplied to the optical deflecting elements constituting the input side deflecting units and the output side deflecting units according to the optical route to be set and a loss characteristic of signal light to be outputted from the output port forming the optical route, and a second loss characteristic storing unit for storing a fixed loss characteristic of signal light which does not depend on the optical route to be set.

In addition, it is also acceptable that the optical switch apparatus further comprises an updating unit for applying a reference light to a pair of input side deflecting unit and output side deflecting unit in an optical route which is an object of updating with respect to the control information in the control information storing unit for updating the contents of the control information storing unit on the updating object optical route on the basis of the characteristics of the input and output power of the reference light passing through the pair of input side deflecting unit and output side deflecting unit.

Still additionally, it is also appropriate that the updating unit includes a reference light outputting unit for outputting the reference light to the input side deflecting unit constituting the optical route which is the object of updating, a reference light monitoring unit for monitoring an output power characteristic from the output side deflecting unit constituting the updating object optical route, and an updating control unit for controlling the updating of the control information on the updating object optical route in the control information storing unit on the basis of a result of the monitor from the reference light monitoring unit.

In this case, the reference light outputting unit is made to output, as the reference light, a light in a wavelength range other than a wavelength of the signal light to the plurality of input side deflecting units.

Yet additionally, it is also appropriate that the reference light outputting unit sets a light in a wavelength range of the signal light as the reference light and conducts the reference light to a route serving as the updating object optical route constituting a pair of input side deflecting unit and output side deflecting unit which are not set as an optical route for the signal light.

Moreover, it is also acceptable that, in the optical switch apparatus, for variably adjusting a level of the signal light the output side deflecting unit outputs to the output port, the optical deflecting elements constituting each of the output side deflecting units are constructed as a level coarse-adjustment element for coarsely adjusting a level of signal light to be outputted to a corresponding output port and a level fine-adjustment element for finely adjusting the level of the signal light to be outputted to the corresponding output port in a latter stage of the level coarse-adjustment element, respectively.

Still moreover, it is also acceptable that the optical switch apparatus further comprises a control information storing unit for storing control information for setting an optical route through which signal light propagates between one of the plurality of input ports and one of the plurality of output ports, a drive voltage control unit for making reference to the contents of the control information storing unit to output a control signal for controlling a drive voltage to be supplied to the optical deflecting elements constituting the input side deflecting units and the output side deflecting units in accordance with the optical route to be set and a power value of output signal light, and a drive voltage supplying unit for supplying the drive voltage controlled by the control signal from the drive voltage control unit, and the drive voltage control unit sets drive voltage information for a level coarse-adjustment element and a level fine-adjustment element constituting the output side deflecting unit in the optical route on the basis of the information stored in the power control information storing unit so as to variably attenuate the signal light outputted from the output port in the optical route to a target level.

Preferably, of the input side deflecting units, the input side deflecting unit disposed to deflect signal light from an input port closer to an end position has more optical deflecting elements each showing a deflection characteristic in a direction opposite to the end position, and of the output side deflecting units, the output side deflecting unit corresponding to an output port closer to an end position has more optical deflecting elements each showing a deflection characteristic in a direction opposite to the end position.

In this case, it is also possible that, of the plurality of input side deflecting units disposed, the input side deflecting unit closer to a right-side end position has more optical deflecting elements each showing a deflection characteristic in the left-side direction and the input side deflecting unit closer to a left-side end position has more optical deflecting elements each showing a deflection characteristic in the right-side direction and, of the output side deflecting units disposed, the output side deflecting unit closer to a right-side end position has more optical deflecting elements each showing a deflection characteristic in the left-side direction and the output side deflecting unit closer to a left-side end position has more optical deflecting elements each showing a deflection characteristic in the right-side direction.

In addition, it is also acceptable that an optical deflecting element on the upstream side in the output side deflecting unit corresponding to an output port through which an optical route for propagating a signal light from the input port is not set (which does not constitute an optical route for propagating a signal light from the input port) is constructed to cut off a leakage of a signal light from each input side deflecting unit into the output side.

Still additionally, it is also acceptable that each of the optical deflecting elements constituting each input side deflecting unit and each output side deflecting unit is provided with a member having an electro-optic effect and an electrode unit for generating the electric field to deflect a signal light inputted.

Furthermore, in accordance with a further aspect of the present invention, there is provided an optical switch apparatus designed to deflect signal light from one of a plurality of input ports for the switching and outputting to one of a plurality of output ports, wherein input side deflecting units made to deflect signal light from the input ports at an angle corresponding to a position of an output port forming an output destination are disposed in corresponding relation to the plurality of input ports and output side deflecting units made to deflect signal light from the input side deflecting unit at an angle corresponding to a signal light guiding direction of the output port and output the signal light to the output port are disposed in corresponding relation to the plurality of output ports, and each of the input side deflecting units and each of the output side deflecting units are constructed such that a plurality of optical deflecting elements each for deflecting signal light through the use of an electric field applied are arranged in a cascade fashion and, of the input side deflecting units, an input side deflecting unit disposed to deflect signal light from an input port closer to an end position has more optical deflecting elements each showing a deflection characteristic in a direction opposite to the end position while, of the output side deflecting units, an output side deflecting unit corresponding to an output port closer to an end position has more optical deflecting elements each showing a deflection characteristic in a direction opposite to the end position.

Still furthermore, it is also possible that, of the plurality of input side deflecting units disposed, the input side deflecting unit closer to a right-side end position has more optical deflecting elements each showing a deflection characteristic in the left-side direction and the input side deflecting unit closer to a left-side end position has more optical deflecting elements each showing a deflection characteristic in the right-side direction and, of the output side deflecting units disposed, the output side deflecting unit closer to a right-side end position has more optical deflecting elements each showing a deflection characteristic in the left-side direction and the output side deflecting unit closer to a left-side end position has more optical deflecting elements each showing a deflection characteristic in the right-side direction.

In this case, it is also acceptable that an upstream-side optical deflecting element constituting the output side deflecting unit corresponding to an output port through which an optical route for propagating a signal light from the input port is not set is constructed to cut off a leakage of a signal light from each input side deflecting unit into the output side.

Yet furthermore, it is also acceptable that each of the optical deflecting elements constituting each input side deflecting unit and each output side deflecting unit is provided with a member having an electro-optic effect and an electrode unit for generating the electric field to deflect a signal light inputted.

In addition, it is also appropriate that the optical switch apparatus further comprises a control information storing unit for preserving control information for setting an optical route, through which signal light propagates between one of the plurality of input ports and one of the plurality of output ports, for each combination of the input ports and the output ports, a drive voltage control unit for making reference to the contents of the control information storing unit to control a drive voltage to be supplied to the optical deflecting elements constituting the input side deflecting unit and the output side deflecting unit according to an optical route to be set, and a drive voltage supplying unit for supplying a drive voltage controlled by the drive voltage control unit.

Still additionally, it is also appropriate that the drive voltage control unit controls a drive voltage to the upstream-side deflecting element constituting the output side deflecting unit corresponding to the output port, through which an optical route for propagating a signal light from the input port is not set, so as to cut off a leakage of a signal light from each input side deflecting unit into the output side.

Moreover, in accordance with a further aspect of the present invention, there is provided a method of updating control information stored in a control information storing unit of an optical switch apparatus, the method comprising supplying a drive voltage to a pair of input side deflecting unit and output side deflecting unit constituting an optical route which is an object of updating of the control information so that a reference light passes therethrough, monitoring output power of the reference light passing through the pair of input side deflecting unit and output side deflecting unit, and updating the contents of the control information storing unit related to the optical route which is the object of updating on the basis of the relationship among a characteristic of input power of the reference light, a result of the monitor of the output power and the drive voltage supplied.

Preferably, in the foregoing method, a light in a wavelength range other than the signal light is used as the reference light.

In addition, it is also appropriate that the relationship in association between the monitored optical power characteristic of the reference light and the optical power characteristic of the signal light is stored in advance for each optical route and the drive voltage to be supplied to the optical deflecting elements constituting the input side deflecting unit and the output side deflecting unit is corrected, in making reference to the contents of the control information storing unit, through the use of the association relationship in the drive voltage control unit.

Still additionally, it is also appropriate that a light in the same wavelength range as the signal light is used as the reference light and a path formed by a pair of input side deflecting unit and output side deflecting unit which are not set as an optical route for the signal light is set as an optical route which is the object of updating so that the reference light passes therethrough.

As described above, according to the present invention, since the control such as feedback control does not work in the process of setting an optical route undergoing the output light power control with respect to the signal light input through the input side deflecting unit and the output side deflecting unit, it is possible to shorten the response time for eliminating the fluctuation of the optical power by a response in a time dimension shorter than, for example, milliseconds.

Moreover, the route switching for frame signal lights inputted through various paths becomes feasible while eliminating the dispersion of an output power value.

Still moreover, the level of optical output power is freely adjustable.

Yet moreover, of the input side deflecting units, the input side deflecting unit disposed to deflect signal light from an input port closer to an end position has more optical deflecting elements each showing a deflection characteristic in a direction opposite to the end position, and of the output side deflecting units, the output side deflecting unit corresponding to an output port closer to an end position has more optical deflecting elements each showing a deflection characteristic in a direction opposite to the end position, which enables the maximum voltage to be supplied to the optical deflecting element to be made constant irrespective of its disposition position and simplifies the control on the input side deflecting units and the output side deflecting units.

BRIEF DESCRIPTION OF THE DRAWINGS

FIG. 2 shows an essential part of the optical switch apparatus according to the embodiment of the present invention;

FIGS. 12A and 12B are illustrations useful for explaining the lead-out of a drive voltage signal corresponding to an optical route and target output power to be set in a switch module;

DESCRIPTION OF THE PREFERRED EMBODIMENTS

Embodiments of the present invention will be described hereinbelow with reference to the drawings.

In addition to the objects of the present invention, other technical objects, means for achieving the technical objects and the effects thereof will become apparent from the disclosure of the following embodiments.

[A] Description of Embodiment

[A1] Total Configuration

Figure 1:
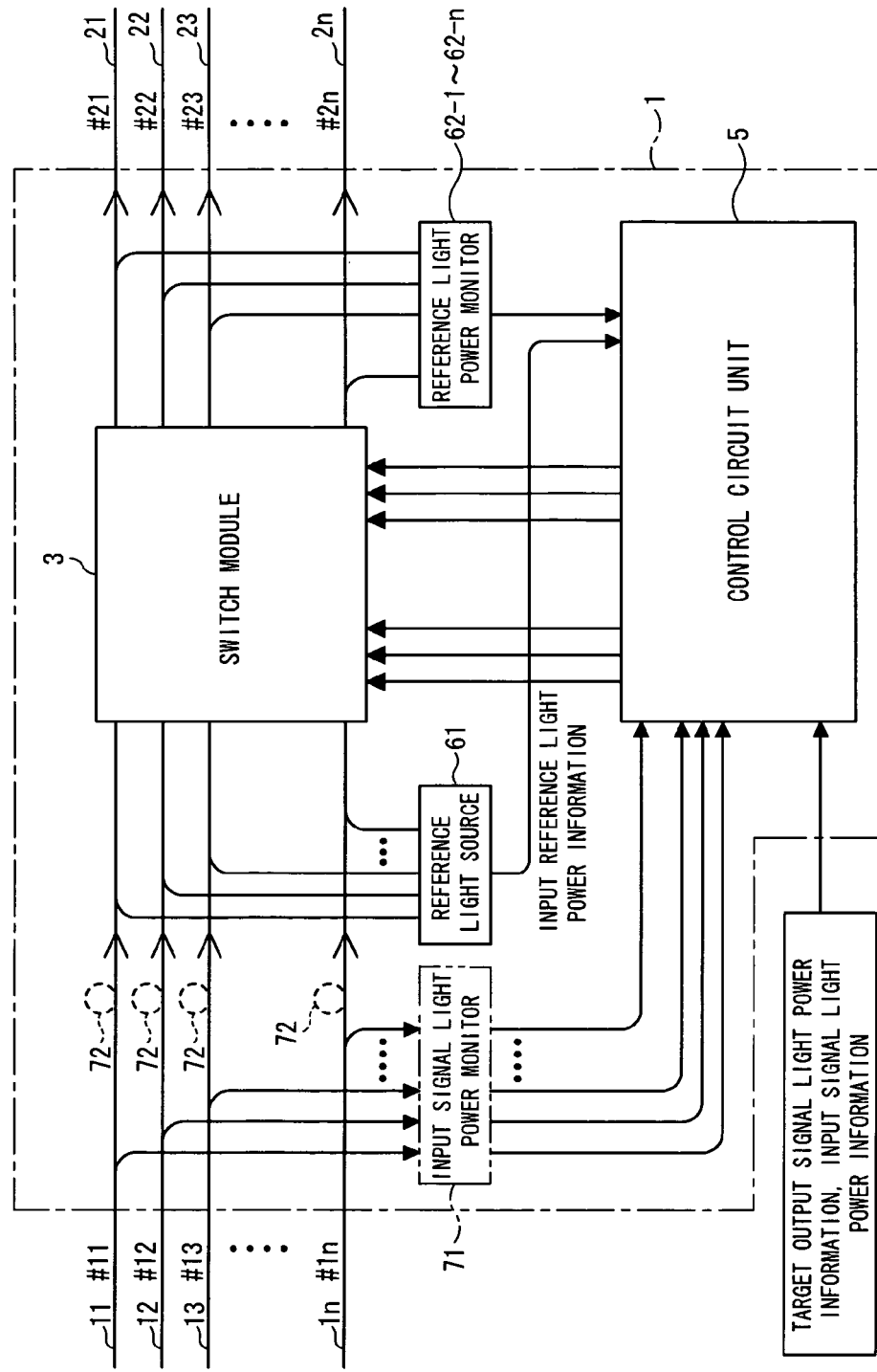
FIG. 1 shows an optical switch apparatus according to an embodiment of the present invention.

FIG. 1 is an illustration of an optical switch apparatus 1 according to an embodiment of the present invention. The optical switch apparatus 1 shown in FIG. 1 is made to switching-setting a route between one of a plurality of (n) input side optical fibers 11 to 1$n$ and one of a plurality of (n) output side optical fibers 21 to 2$n$, and it comprises a switch module 3 and a control circuit unit 5 for controlling the switch module 3.

In this configuration, the switch module 3 receives signal lights from the n input side optical fibers 11 to 1$n$ through input ports #11 to #1$n$ of the optical switch apparatus 1 and sets optical routes through output ports #21 to #2$n$ to the n output side optical fibers 21 to 2$n$ by means of inputted signal light route switching.

The control circuit unit 5 receives information on an optical route to be set between one of the input side optical fibers 11 to 1$n$ and one of the output side optical fibers 21 to 2$n$ to carry out the control for the optical route setting on the switch module 3 and further receives information on the level of a target output power of signal light to variably control the output power of signal light to be led from output side deflecting units 41 to 4$n$ to the output ports #21 to #2$n$.

Accordingly, the relationship between the output power of a signal light and a controlling quantity to the switch module 3 is stored in advance in the aforesaid control circuit unit 5, and the updating of this relationship therebetween is possible. For this updating processing, in addition to a reference light source 61 and a reference light power monitors (PDs) 62-1 to 62-n, there are provided an optical coupler 63 and wavelength couplers 64-1 to 64-n and 65-1 to 65-2 (see FIG. 2).

The reference light source 61 is for outputting a reference light to measure an input/output power characteristic with respect to the switch module 3, and a light with a wavelength which is out of a wavelength range of signal lights. Concretely, in a case in which a C-band wavelength range is used as a signal light wavelength range, a reference light wavelength can be set in an L-band wavelength range.

The optical coupler 63 is made to demultiplex a light from the reference light source 61 to supply them to the input side optical fibers 11 to 1n respectively corresponding to the input ports #11 to #1n. The wavelength multiplex couplers 64-1 to 64-n are for multiplexing the reference lights from the optical coupler 63 with the signal lights from the input side optical fibers 11 to 1n, respectively. Thus the reference lights can be supplied to input side deflecting units 31 to 3n.

Moreover, the optical couplers 65-1 to 65-n are for wavelength-demultiplexing (branching) the reference lights outputted from the respective output side deflecting units 41 to 4n, with the reference light components wavelength-demultiplexed being outputted to the reference light power monitors 62-1 to 62-n. Thus, each of the reference light power monitors 62-1 to 62-n monitors the output power of the reference light passing through the switch module 3 and outputs a result of the monitor to the control circuit unit 5.

In this connection, in the control circuit unit 5, when reference light powers inputted through the input ports #11 to #1n are also stored in advance, the relationship between the output power of the signal light and the controlled variable for the switch module 3 can be updated through the use of an updating control function which will be mentioned later.

[A2] Configuration of Switch Module 3

Figure 15:
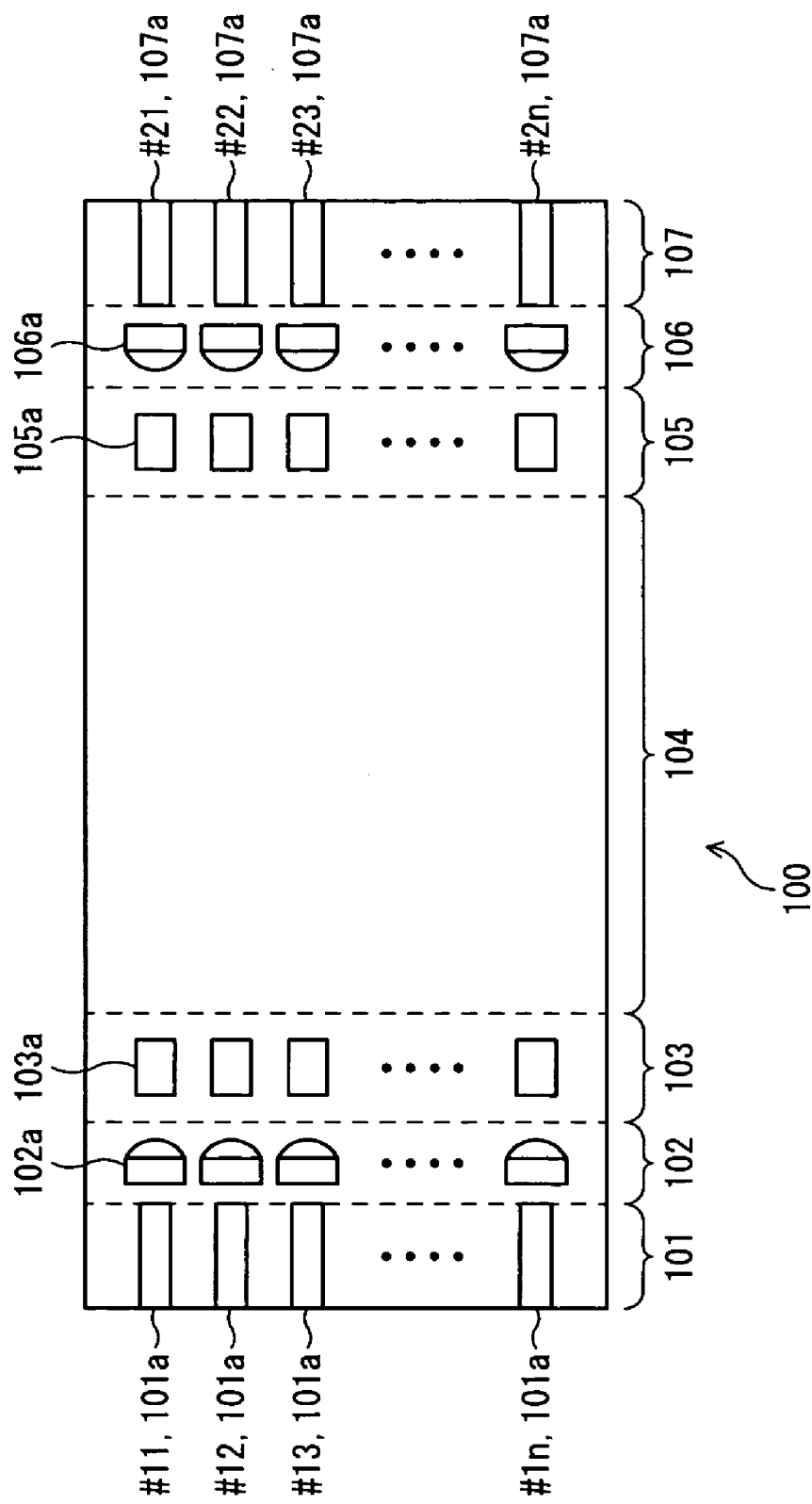
FIGS. 15 and 16 are illustrations of conventional techniques.
Figure 16:
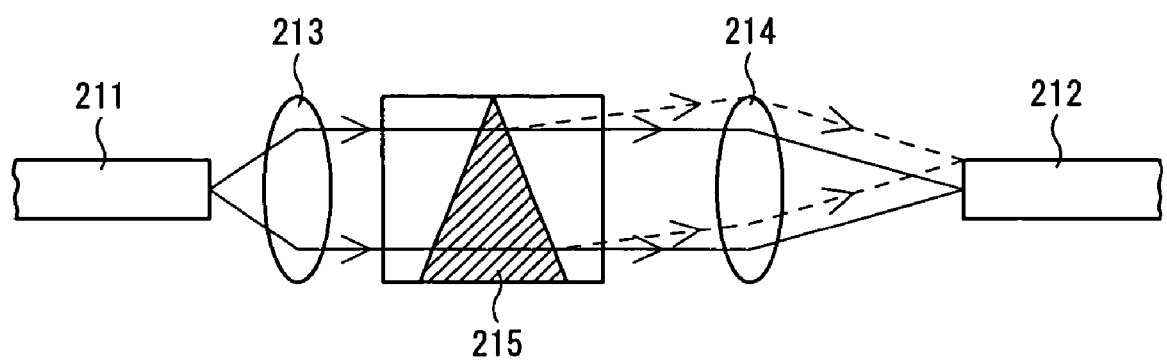

As FIG. 2 shows, the switch module 3 comprises input side deflecting units 31 to 3n and output side deflecting units 41 to 4n. FIG. 2 indicates a case of n=4. Moreover, in the switch module 3, for introducing the lights from the input ports #11 to #1n into the input side deflecting units 31 to 3n and for leading the output signal lights from the output side deflecting units 41 to 4n to the output ports #21 to #2n, it is also acceptable that optical systems (reference numerals 101 to 102, 106 to 107) similar to those in the example shown in FIG. 15 are interposed therebetween.

In this configuration, the input side deflecting units 31 to 3n are for deflecting the signal lights from the input ports #11 to #1n so as to make angles corresponding to the positions of the output ports #21 to #2n which are output destinations and are arranged in parallel with respect to the input ports 11 to 1n. These input side deflecting units 31 to 3n are constructed such that a plurality of (three in this embodiment) optical deflecting elements 311, 312 are arranged in a cascade fashion.

The output side deflecting units 41 to 4n are disposed in parallel with respect to the input side deflecting units 31 to 3n in a state where a free space 30c is interposed therebetween and disposed in parallel with respect to the output ports #21 to #2n in corresponding relation. Each of the output side deflecting units 41 to 4N is made to deflect the signal light from each of the input side deflecting units 31 to 3n at an angle corresponding to a signal light guiding direction toward each of the output ports #21 to #2n, thereby outputting it to each of the output ports #21 to #2n. Likewise, the output side deflecting units 41 to 4n are constructed in a manner such that a plurality of optical deflecting elements 411, 413 each for deflecting a signal light through an electric field applied from the control circuit unit 5 are arranged in a cascade fashion.

The free space 30c is made to have a length so that each of the signal lights emitted from the input side deflecting units 31 to 3n is optically coupled through deflection to any one of the output side deflecting units 41 to 4n, and each of the signal lights go straight toward any one of the output side deflecting units 41 to 4n in this free space 30c.

Moreover, the optical deflecting elements 311, 312, 411-413 constituting the input side deflecting units 31 to 3n or the output side deflecting units 41 to 4n can have a function to make a variable adjustment on the levels of the signal lights to be outputted to the output ports #21 to #2n. In this embodiment, as mentioned later, the optical deflecting elements 411 to 413 organizing the output side deflecting units 41 to 4n have aforesaid function to make the variable adjustment on the levels of the output signal lights in addition to a route switching function.

Figure 3A:
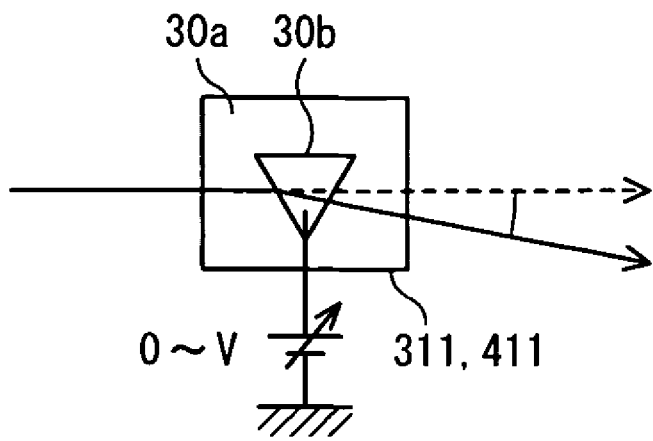
FIGS. 3A to 3C are illustrations useful for explaining an operation of an optical deflecting element in this embodiment.

Still moreover, as shown in FIG. 3A, each of the optical deflecting elements 311 and 411 is equipped with a crystal member 30a, such as lithium niobate or PLZT, having an electro-optic effect and a pair of electrodes 30b formed in opposed relation to the upper and lower surfaces of the crystal member 30a. When a drive voltage is supplied to the electrodes 30b, an electric field is applied to the crystal member 30a and, hence, an inputted signal light is deflected in a right-side direction owing to the electrical effect such as the Pockels effect. Therefore, the light deflecting elements 311 and 411 are constructed as a right-side deflecting element.

Figure 3B:
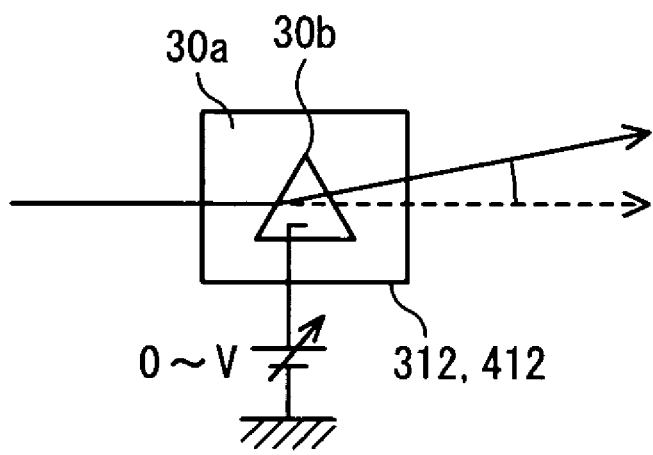

In addition, likewise, as shown in FIG. 3B, each of optical deflecting elements 312 and 412 is equipped with a crystal member 30a and a pair of electrodes 30b. When a drive voltage is supplied to the electrodes 30b, an electric field is applied to the crystal member 30a so that an inputted signal light is deflected in a left-side direction owing to the electrical effect such as the Pockels effect. Therefore, the light deflecting elements 312 and 412 are constructed as a left-side deflecting element unlike the optical deflecting elements 311 and 411.

Figure 3C:
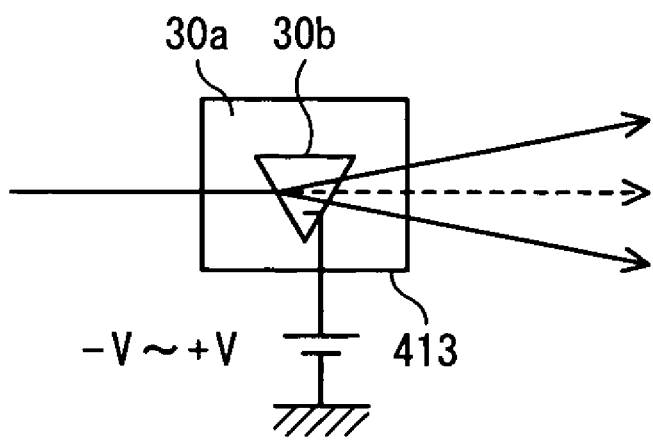

Still additionally, as shown in FIG. 3C, each of optical deflecting elements 413 includes a crystal member 30a and a pair of electrodes 30b and has a function to, when a drive voltage is supplied to the electrodes 30b, deflect an inputted signal light in left-side or right-side direction with respect to the inputting direction.

As mentioned above, each of the input side deflecting units 31 to 3n is constructed in a manner such that, of the optical deflecting elements 311 and/or the optical deflecting elements 312, three in total are disposed in a cascade fashion, and a combination of the optical deflecting elements 311 and 312 (combinations different in number of the disposed optical deflecting elements 311 or 312) is made in accordance with the disposition position of each of the input side deflecting units 31 to 3n.

That is, in the input side deflecting unit 31 disposed at a left-side end portion with respect to the advancing direction of the signal light, the optical deflecting elements 311 disposed is largest in number while the number of optical deflecting elements 312 disposed is at a minimum. On the other hand, the number of optical deflecting elements 311 disposed successively decreases from the left-end-side input side deflecting unit 31 toward the input side deflecting unit 3n disposed at the right-side end portion while the number of optical deflecting elements 312 disposed successively increases.

In other words, the input side deflecting unit 31 to 3n disposed more leftwardly, which is made to deflect a signal light from the input port, has more optical deflecting elements 311 having a deflection characteristic in the right-side direction opposite to the left-end side, and the input side deflecting unit 31 to 3n disposed more rightwardly, which is made to deflect a signal light from the input port, has more optical deflecting elements 312 having a deflection characteristic in the left-side direction opposite to the right-end side.

Therefore, of the input side deflecting units 31 to 3n, the input side deflecting units 31 and 3n closer to the end-position sides and made to deflect signal light from the input ports are arranged to have more optical deflecting elements 311, 312 each showing a deflection characteristic in a direction opposite to the end-position side. That is, since the input side deflecting unit corresponding to the input port on the right-end side is required to have a relatively larger deflection quantity in the left-side direction for setting a optical path to be connected to the output side deflecting unit corresponding to the left-side output port, more optical deflecting elements 312 are disposed as the left-side deflecting elements.

Moreover, each of the output side deflecting units 41 to 4n is constructed in a manner such that, on the upstream side, of the optical deflecting elements 411 and/or the optical deflecting elements 412, three in total are disposed in a cascade fashion and the downstream-side optical deflecting elements 413 are further disposed in a cascade fashion, and the number of the optical deflecting element 411, 412 disposed is set in accordance with the disposition position of each of the output side deflecting units 41 to 4n.

That is, of the n output side deflecting units 41 to 4n, the output side deflecting unit 41 disposed on the left-side end portion with respect to the advancing direction of the signal light is constructed such that the number of optical deflecting elements 411 disposed becomes at a maximum while the number of optical deflecting elements 412 disposed becomes at a minimum and, on the other hand, the number of optical deflecting elements 411 disposed successively decreases from the left-end side output side deflecting unit 41 toward the output side deflecting unit 4n placed on the right side while the number of optical deflecting elements 412 disposed successively increases.

Therefore, of the output side deflecting units 41 to 4n, the output side deflecting units 41 to 4n corresponding to the output ports closer to the end-position sides are made to have more optical deflecting elements 411, 412 each having a deflection characteristic in a direction opposite to the end position. That is, since the input side deflecting unit corresponding to the right-end side output port is required to have a relatively larger deflection quantity in the left-side direction for setting a optical path for guiding the signal light from the input side deflecting unit corresponding to the left-side input port to its own corresponding output port, the number of the optical deflecting elements 412 forming the left-side deflecting elements to be disposed increases.

Incidentally, with respect to the optical deflecting elements 311, 312, 411 and 412, although in this embodiment the optical deflecting elements 311 and 411 forming the left-side deflecting elements are disposed on the upstream side of the optical deflecting elements 312 and 412 and the optical deflecting elements made to conduct the deflection in the same direction are lined up, the present invention is not limited to the sequence of the cascade disposition, provided that, in the input side deflecting units 31 to 3n and the output side deflecting units 41 to 4n, at least the optical deflecting elements are distributively disposed in number as mentioned above.

In addition, in this embodiment, the optical deflecting elements 311 and 411 forming the left-side deflecting elements and the optical deflecting elements 312 and 412 forming the right-side deflecting elements are constructed such that the electrode 30b formed on the same surface side (for example, upper surface side) of the crystal member 30a is set as a positive electrode while the electrode 30b formed on the other surface in opposed relation thereto is set as a ground electrode and the directions of the deflection of signal light are opposite to each other. On the other hand, with respect to the optical deflecting elements 413, both positive and negative electrode voltages are supplied as drive voltages to the pair of electrodes 30b so that the signal light can be deflected in the right- or left-side direction.

Therefore, for example, an optical route can be set between one of the input side optical fiber 1i (i:1 to n) and one of the output side optical fiber 2j (j:1 to n) through the control of the input side deflecting unit 3i and the output side deflecting unit 4j by the control circuit unit 5. That is, the optical deflecting elements 311 and 312 of the input side deflecting unit 3i deflect the signal light from the input side optical fiber 1i toward the output side optical fiber 2j, and the optical deflecting elements 411 to 413 of the output side deflecting unit 4j deflect the signal light from the input side deflecting unit 3i to lead it to the output side optical fiber 2j.

Incidentally, in the input side deflecting units 31 to 3n and the output side deflecting units 41 to 4n, the control circuit unit 5, mentioned later, supplies the same drive voltage to the optical deflecting elements 311 and 411 (312, 412) which make the deflection in the same direction, thereby simplifying the control.

Moreover, each of the optical deflecting elements 311, 312 and 411 to 413 is made to increase the signal light deflection angle in accordance with an increase in the value of the voltage to be supplied while, in comparison with the other optical deflecting elements 311, 312, 411 and 412, the optical deflecting elements 413 is made such that the signal light deflection angle becomes minute irrespective of the supply of the same voltage.

Figure 4:
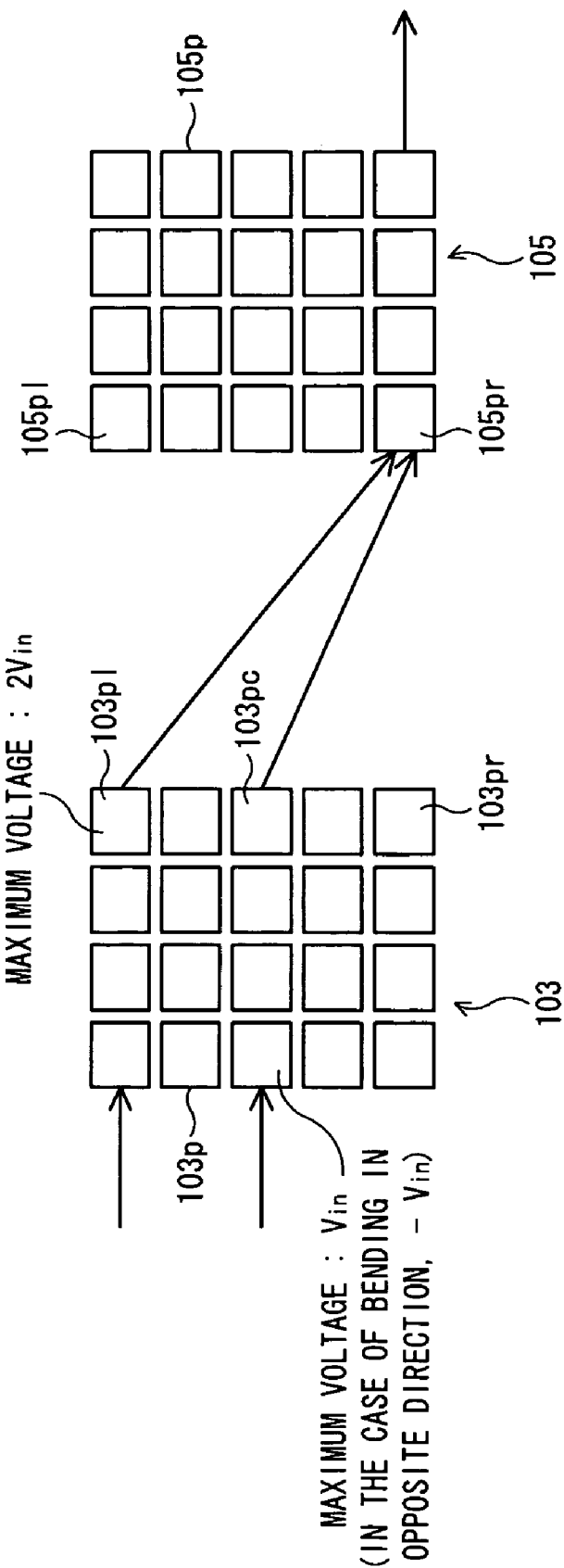
FIG. 4 is an illustration of a comparison of a switch module in this embodiment shown in FIG. 2 with an optical switch module disclosed in the aforesaid patent document 1.

FIG. 4 is an illustration for a comparison of the input side deflecting units 31 to 3n and the output side deflecting units 41 to 4n in the switch module 3 according to this embodiment with the configuration of the optical switch module disclosed in the aforesaid patent document 1. In FIG. 4, the object of comparison with the configurations of the input side deflecting units 31 to 3n in this embodiment is the input side optical deflecting element unit 103, and the object of comparison with the configurations of the output side deflecting units 41 to 4n is an output side optical deflecting element unit 105.

The input side optical deflecting element unit 103 includes a plurality of prism pairs 103p disposed on the same line for each input port and the output side optical deflecting element unit 105 includes a plurality of prism pairs 105p disposed on the same line for each output port. Each of the prism pairs 103p and 105p is designed to deflect a signal light in a right-side or left-side direction in accordance with the polarity of a drive voltage supplied.

Accordingly, with respect to the drive voltage to the prism pair 103p constituting the input side optical deflecting element unit 103, particularly, in the prism pairs 103pr and 103pl on the right- and left-end lines, there is a need to apply, for example, a voltage of 2 $V_{in}$ as a maximum drive voltage. This maximum drive voltage has a highest value in comparison with a drive voltage needed for the other prism pairs 103p. This is because, when the incidence is made on the opposite-side end line prism pair (for example, the right-end line prism pair 105pr relative to the prism pair 103pl), the deflection angle takes the largest value in comparison with the other routes between the input/output ports.

Meanwhile, since there is a need to secure a deflection angle so that a signal light outputted from the central line prism pair 103pc can be incident on the left-end line and right-end line prism pairs 105pl and 105pr constituting the output side optical deflecting element unit 105, in the prism pair 103pc, it is necessary that, for example, a voltage of $-V_{in}$ to $+V_{in}$ can be set as a drive voltage.

The case of the above-mentioned case input side optical deflecting element unit 103 also applies to the drive voltage to the prism pair 105p constituting the output side optical deflecting element unit 105.

Thus, in the case of the technique disclosed in the patent document 1, since the range of a drive voltage to be supplied to the prism pairs 103p and 105p, i.e., the dynamic range, varies in accordance with the disposition position, it can be considered to complicate the circuit arrangement for the control of the drive voltage.

Figure 5:
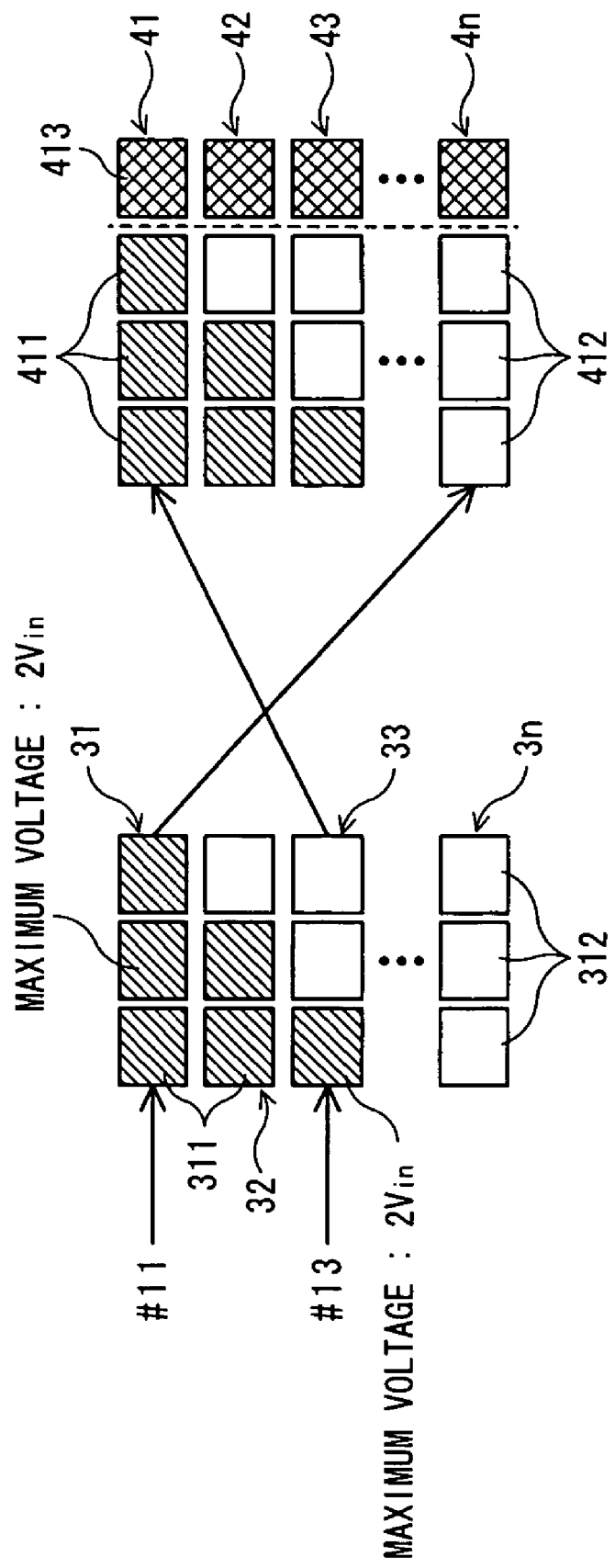
FIG. 5 is an illustration of a difference of a switch module in this embodiment from the optical switch module written in the aforesaid patent document 1.

On the other hand, in the switch module 3 according to this embodiment, since the optical deflecting elements 311 and 312 constructed as mentioned above are disposed in accordance with the disposition position of the input side deflecting units 31 to 3n, as shown in FIG. 5, the maximum application voltage to be supplied among the input side deflecting units 31 to 3n can be secured at $2V_{in}$, and the polarity of the drive voltage to be supplied can be made even, thus simplifying the circuit arrangement for the control of the drive voltage in comparison with the case shown in FIG. 4.

[A3] Configuration of Control Circuit Unit 5

Figure 6:
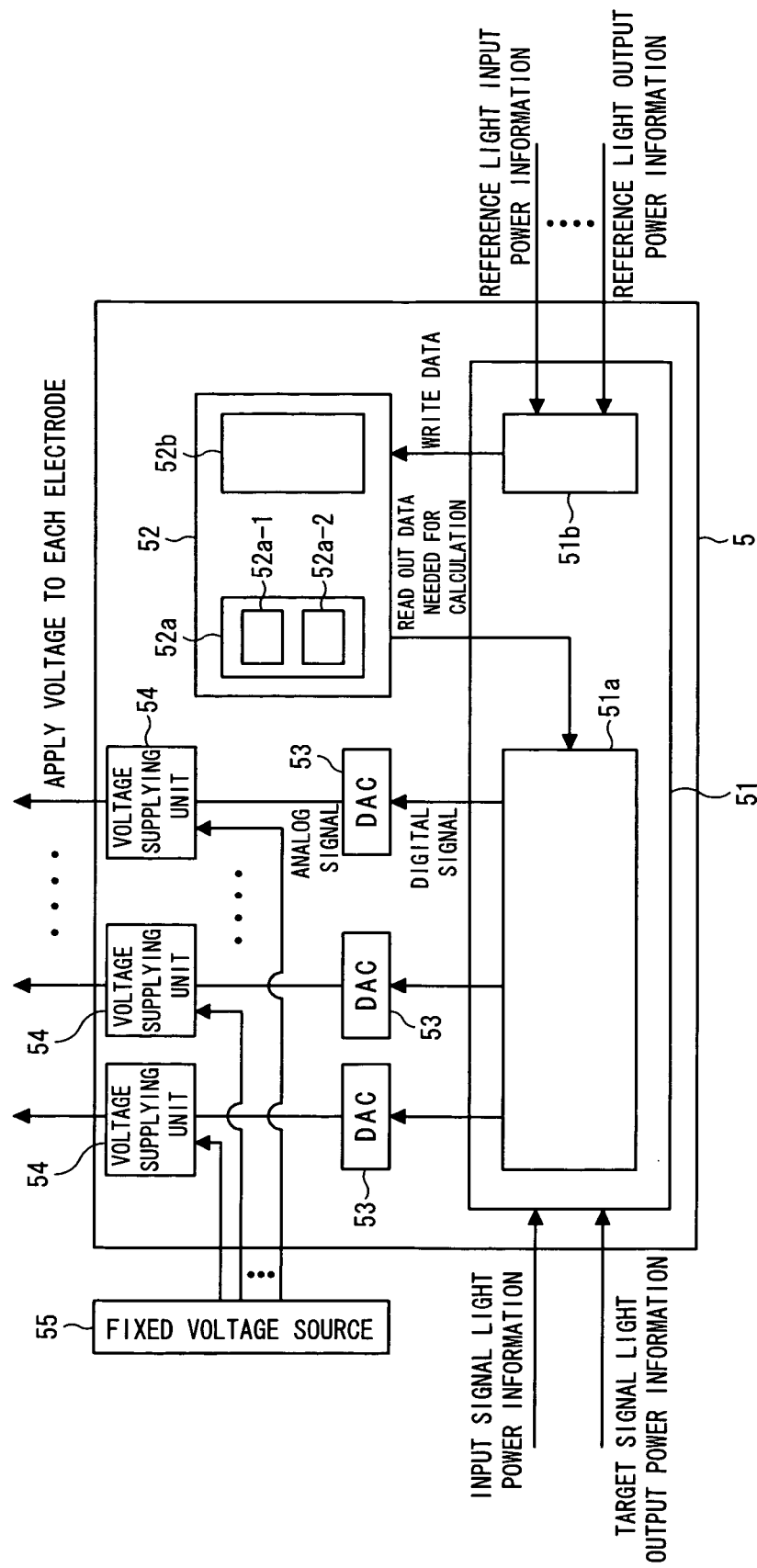
FIG. 6 is an illustration of a control circuit unit of an optical switch apparatus according to an embodiment of the present invention.

Meanwhile, as mentioned above, the control circuit unit 5 of the optical switch apparatus shown in FIG. 1 receives the information on an optical route to be set between one of the input side optical fibers 11 to 1n and one of the output side optical fibers 21 to 2n to carry out the control for setting the optical route with respect to the switch module 3, and further receives the information on a target output power of signal light level to variably control the output power of the signal light to be led from the output side deflecting units 41 to 4n to the respective output ports #21 to #2n. Accordingly, as shown in FIG. 6, the control circuit unit 5 is composed of a control unit 51, a control information storing unit 52, a digital/analog converter (DAC) 53 and a voltage supplying unit 54.

In this configuration, the control information storing unit 52 is made to store the control information for setting an optical route through which a signal light propagates between one of the input ports #11 to #1n and one of the output ports #21 to #2n. This control information includes the information for controlling the input side deflecting units 31 to 3n and the output side deflecting units 41 to 4n for the route switching corresponding to an optical route to be set and the information for controlling the power of a signal light to be led to the respective output ports #21 to #2n.

That is, the control information storing unit 52 includes a first loss characteristic storing unit 52a for preserving a drive voltage to be supplied to each of the optical deflecting elements 311, 312 and 411 to 413 constituting the input side deflecting units 31 to 3n and the output side deflecting units 41 to 4n in accordance with an optical route to be set and a loss characteristic of a signal light to be outputted from the output port forming this optical route, and a second loss characteristic storing unit 52b for storing a fixed loss characteristic of a signal light which does not depend upon the optical route to be set.

For example, the first loss characteristic storing unit 52a is made to, for setting an optical route between a pair of the input/output ports #11 to #1n and #21 to #2n, store not only a drive voltage value, which optimizes the coupling characteristic of a signal light (for example, minimizes the loss) between the input port #1i and the output port #2j (i, j:1 to n) forming the optical route and an optical loss characteristic, but also information on an optical loss characteristic relative to a drive voltage variation from this drive voltage value in a given range .

That is, the first loss characteristic storing unit 52a includes an optimum-state characteristic storing unit 52a-1 for storing a drive voltage for optimizing the coupling characteristic of a signal light (for example, minimizes the loss) between the input port #1i and the output port #2j (i, j:1 to n) forming the optical route and the loss characteristic of the inputted signal light in this case for each optical route settable, and a variation-state characteristic storing unit 52a-2 for storing an optical loss characteristic relative to a drive voltage variation from the aforesaid optimum-state drive voltage in a given range according to each optical route settable.

Moreover, the second loss characteristic storing unit 52b is for storing a proper loss characteristic due to a branch/coupling element such as the optical couplers 64-1 to 64-n in the optical switch apparatus 1.

The control unit 51 is made to carry out the control on the switch module 3 through the use of the contents stored in the aforesaid control information storing unit 52, and it is composed of a drive voltage control unit 51a and an updating control unit 51b. For example, this control unit 51 can be constructed with a CPU (Central Processing Unit) and it can also be made with the aforesaid control information storing unit 52 and an FPGA (Field Programmable Gate Array)

The drive voltage control unit 51a is made to make reference to the contents of the control information storing unit 52 for outputting a control signal to control a drive voltage to be supplied to each of the optical deflecting elements 311, 312 and 411 to 413 constituting the input side deflecting units 31 to 3n and the output side deflecting units 41 to 4n according to an optical route to be set and an input signal light power and a target output power value.

Moreover, the drive voltage control unit 51a is made to output, as a control signal with a digital value, the drive voltage information derived as mentioned above to each of the digital/analog converters 53 coupled to the corresponding optical deflecting elements 311, 312 and 411 to 413.

The updating control unit 51b updating-controls the control information on an optical route which is an object of updating in the control information storing unit 52 on the basis of a result of the monitor from the reference light power monitors 62-1 to 62-n. An updating mode on the control information in the updating control unit 51b will be mentioned later.

The digital/analog converters 53 are for converting a control signal (digital value) to each of the optical deflecting elements 311, 312 and 411 to 413 derived as mentioned above into an analog value, with the control signal with this analog value being outputted to each of the voltage supplying units 54 coupled to the corresponding one of the optical deflecting elements 311, 312 and 411 to 413.

Each of the drive voltage supplying units 54 is for supplying a drive voltage, controlled by a control signal from the drive voltage control unit 51a, to each of the optical deflecting elements 311, 312 and 411 to 413. Concretely, a control signal from the drive voltage control unit 51a is inputted through the digital/analog converter 53 thereto as a control signal with an analog value to conduct the voltage conversion on a voltage signal from the fixed voltage source 55 for obtaining a voltage signal corresponding to the drive voltage information derived by the drive voltage control unit 51a, with the obtained drive voltage signal being supplied to the corresponding one of the optical deflecting elements 311, 312 and 411 to 413.

Moreover, to the optical deflecting elements 311, 312 and 411 to 413 of each of the input side deflecting units 31 to 3n and each of the output side deflecting units 41 to 4n, a drive voltage signal from each of the voltage supplying units 54 is supplied through the electrode 30b. Owing to this drive voltage signal, a refractive index variation occurs due to the Pockels effect, thereby deflecting a signal light inputted.

[A4] Description of Variable Attenuation Function on Output Signal Light in Switch module 3 Under Control of Control Circuit Unit 5

Figure 7A:
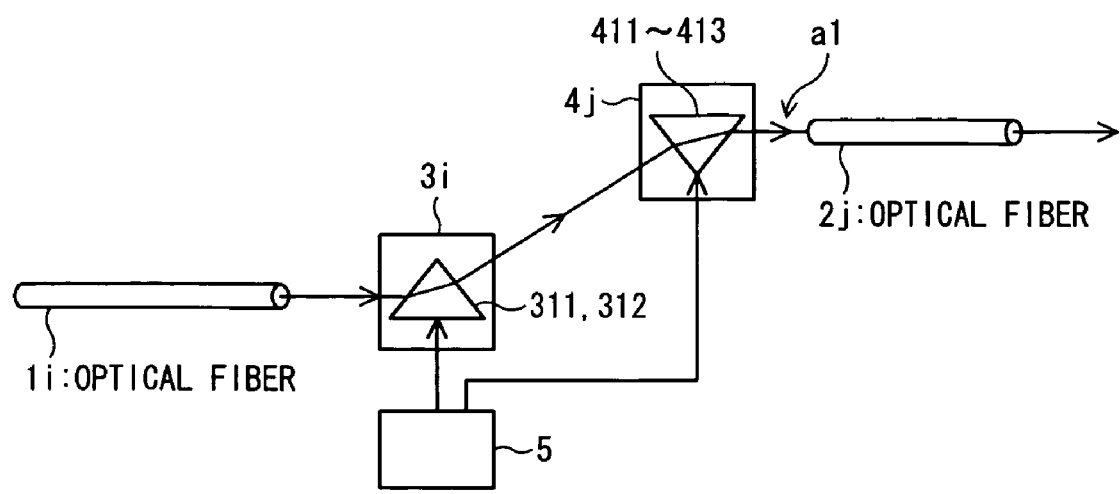
FIGS. 7A and 7B are illustrations useful for explaining a technique of varying the power of an output signal light outputted through an output port to a target value.
Figure 7B:
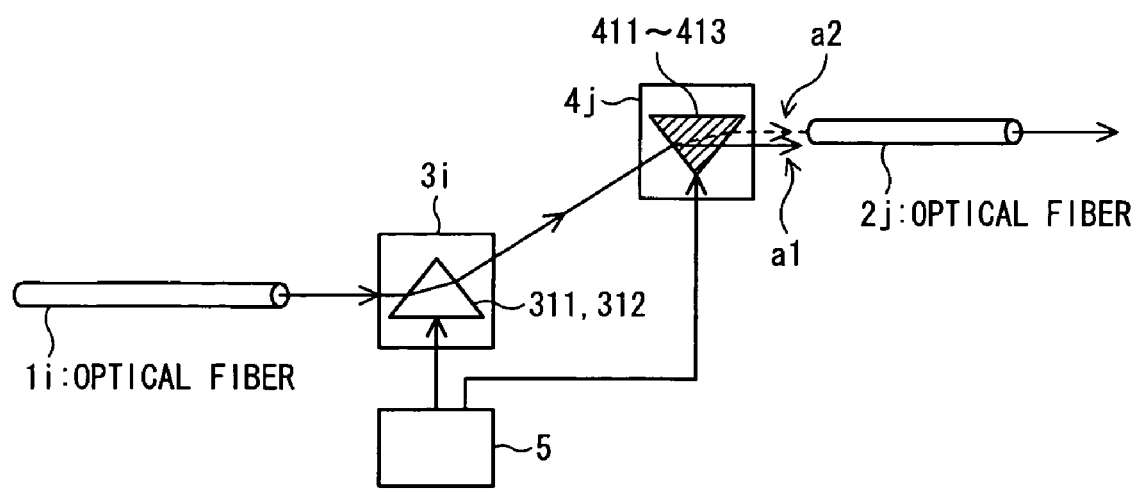

FIGS. 7A and 7B are illustrations useful for the explanation to the effect of variably adjusting, to a target value, the power of an output signal light to be outputted through the output ports #21 to #2n by controlling the drive voltage to each of the optical deflecting elements 311, 312 and 411 to 413 of the input side deflecting units 31 to 3n and the output side deflecting units 41 to 4n in the control circuit unit 5.

In a case in which an optical route is set between one of the input side optical fiber 1i and one of the output side optical fiber 2j (i, j:1 to n), if drive voltage information which does not provide a variable attenuation quantity in the drive voltage control unit 51a is outputted, for example, as shown in FIG. 7A, the coupling of a signal light between the input side deflecting unit 3i and the output side deflecting unit 4j and the coupling of a signal light from the output side deflecting unit 4j to the output side optical fiber 2j enables a minimum loss state (see a1 in this illustration).

However, at this time, if the signal light power outputted from the output side optical fiber 2j exceeds the target value, as shown in FIG. 7B, the drive voltage information for the supply to the optical deflecting elements 411 to 413 of the output side deflecting unit 4j is adjusted to operate the variable attenuation function for adjusting the deflecting state of the signal light to be outputted from the output side deflecting unit 4j so that the optical coupling efficiency with respect to the output side optical fiber 2j lowers (see a2 relative to a1 in the illustration).

That is, since the drive voltage control unit 51a makes reference to the first and second loss characteristic storing units 52a and 52b constituting the control information storing unit 52 for the adjustment of the drive voltage information, through the above-mentioned degradation of the optical coupling efficiency between the output side deflecting unit 4j and the output side optical fiber 2j, the power of the signal light outputted through the output side optical fiber 2j is adjustable to the target output power.

In other words, the supply of a drive electric signal to each of the optical deflecting elements 311, 312 and 411 to 413 by the control circuit unit 5 enables the setting-control on a route between one of the input/output fibers #11 to #1n and #21 to 2n and one of the variable control on the output level of the signal light to be led to the output ports #21 to #2n.

The contents stored in the aforesaid first loss characteristic storing unit 52a are information which can be updated in the updating control unit 51b which will be mentioned later, and they are written in a rewritable memory. On the other hand, the second loss characteristic storing unit 52b is for storing a fixed loss characteristic(s) of the optical switch apparatus 1, and the contents thereof are written in a non-rewritable memory.

Moreover, the drive voltage control unit 51a can be made to receive the aforesaid optical route setting information through the use of, for example, light in a control channel set in a network to which the optical switch apparatus 1 is applied. Moreover, the target output power of signal light level information can be stored in the aforesaid control information storing unit 52 in advance, or it can also be received through the use of the light in the aforesaid control channel.

Still moreover, with the hope that the aforesaid drive voltage control unit 51a is made to set the optical power of the signal light outputted through the output side optical fiber 21 to 2n at the target output power, there is a need to derive an attenuation quantity needed for the input signal light power. The derivation of this attenuation quantity requires information on the optical power (input signal light power) at the time that the signal light is inputted to the input ports #11 to #1n.

In this embodiment, this information on the input signal light power can previously be stored in the control information storing unit 52 or the like in the stage of the setting of the optical route. In this case, it is also appropriate that the aforesaid input signal light power information is received through the use of the light in the aforesaid control channel.

In addition, for example, it is also appropriate that, as shown in FIG. 1, an input signal light power monitor 71 is provided to measure the optical power of the signal light inputted through the input ports #11 to #1n so that, in the input signal light power monitor 71, the optical power of the input signal light is measured at the time that the signal light to be transmitted through the optical route is inputted thereto and this measurement result is used for deriving an attenuation quantity for obtaining an output signal light with the target output power.

In this case, for the purpose of the input of the input signal light to the switch module 3 being placed into a wait condition for the processing time from when the input signal light is inputted through the input ports #11 to #1n until the input power is measured in the input power monitor 71 and the drive voltage for obtaining the target output power is supplied by the control circuit unit 5, it is also appropriate that optical delay lines 72 are interposed between the input ports #11 to #1n and the switch module 3.

[A5] Description of Variable Attenuation Function on Output Signal Light in Optical Deflecting Elements 411 to 413

As mentioned above, a signal light can be deflected by controlling each of the optical deflecting elements 311, 312 and 411 to 413 constituting the input side deflecting units 31 to 3n or the output side deflecting units 41 to 4n of the switch module 3 through the use of a drive voltage signal from the control circuit unit 5, thereby setting an arbitrary optical route between one of the input side optical fibers 11 to 1n and one of the output side optical fibers 21 to 2n.

At this time, in the drive voltage control unit 51a organizing the control circuit unit 5, the drive voltage is adjusted/controlled so as to control the power of the signal light to be outputted to each of the output side optical fibers 21 to 2n to a desired output power value. In this embodiment, the drive voltage to each of the optical deflecting elements 411 to 413 constituting the output side deflecting units 41 to 4n is adjusted to conduct the variable attenuation on the power of the output signal light, thus controlling it to the desired output power value. In other words, each of the optical deflecting units 411 to 413 constituting the output side deflecting units 41 to 4n combines a function to variably adjusting the level of an output signal light as mentioned above and the route switching function.

Figure 8A:
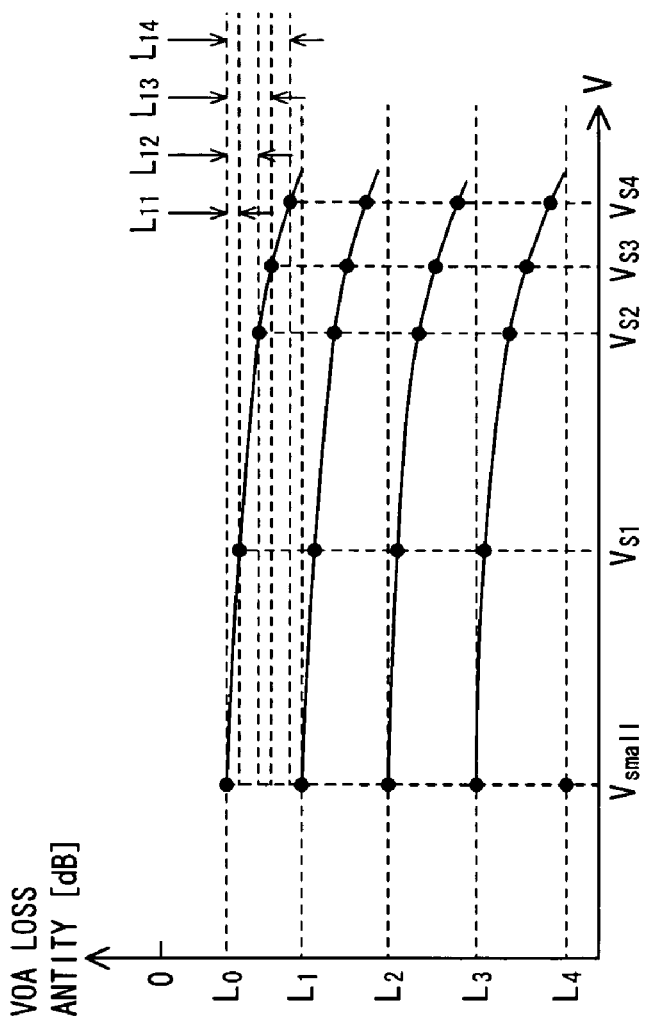
FIG. 8A is an illustration useful for explaining an optical variable attenuation function of an optical deflecting element serving as a coarse adjustment element in this embodiment.
Figure 8B:
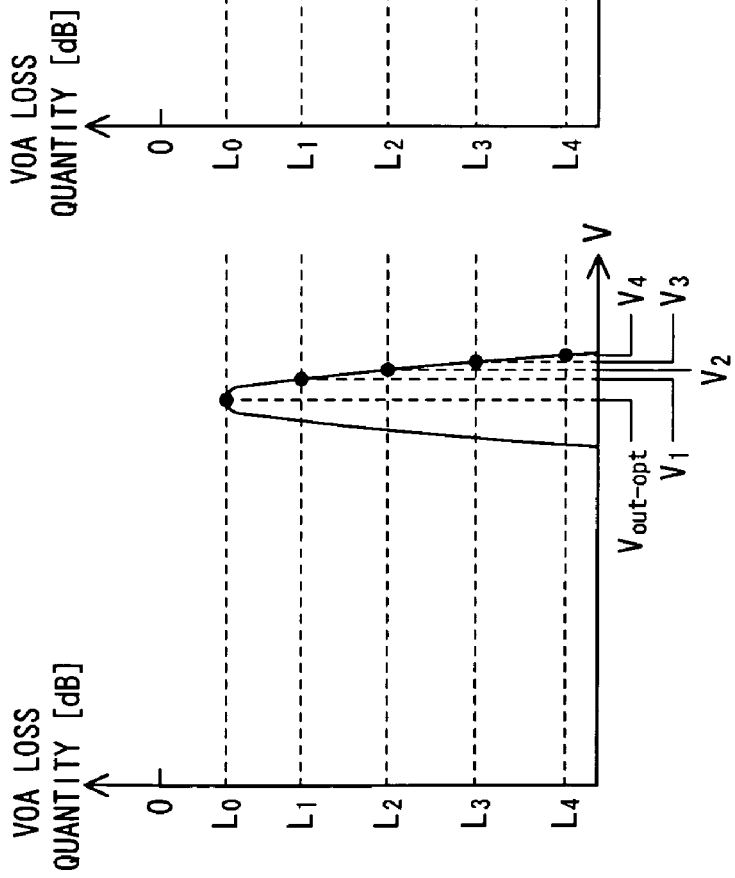
FIG. 8B is an illustration useful for explaining an optical variable attenuation function of an optical deflecting element serving as a fine adjustment element in this embodiment.

FIGS. 8A and 8B are illustrations useful for explaining the optical variable attenuation function of the optical deflecting elements 411 to 413 in this embodiment. FIG. 8A shows the relationship between a variation of the drive voltage in the optical deflecting elements 411 and 413 and a loss of the output signal light, and FIG. 8B shows the relationship between a variation of the drive voltage in the optical deflecting element 413 and a loss of the output signal light.

In this case, of the optical deflecting elements 411 to 413 constituting the output side deflecting units 41 to 4n, the upstream-side (input side deflecting unit 31 to 3n side) optical deflecting elements 411 and 412 are constructed as a coarse-adjustment element made to coarsely adjust the level (power) of a signal light to each of the output ports #21 to #2n to which the signal light is led from each of the output side deflecting units 41 to 4n, while the optical deflecting element 413 in the latter stage (on the downstream side) of each of the output side deflecting units 41 to 4n is arranged as a fine-adjustment element made to finely adjust the level of the signal light to the corresponding one of the output ports #21 to #2n.

That is, in the optical deflecting elements 411 and 412 serving as the coarse-adjustment element, as the drive voltage corresponding to the drive voltage information stored in the drive voltage storing unit, $V_{out\text{-}opt}$ is supplied to each of the optical deflecting elements 411 to 412 of the output side deflecting units 41 to 4n forming the relevant optical route and $V_{small}$ is supplied to the optical deflecting element 413, so $L_0$ in FIGS. 8A and 8B is attainable as the loss of the output signal light.

In the case of varying the drive voltage to the optical deflecting elements 411 and 412, there is a need to vary the controlled variable depending on a digital signal forming the control signal to be outputted from the aforesaid drive voltage control unit 51a. Moreover, on the basis of the resolution of the digital signal which can be outputted from the drive voltage control unit 51a, discrete drive voltages indicated by $V_1$ to $V_4$ in FIG. 8A are applied to the optical deflecting elements 411 and 412.

At this time, since the optical deflecting elements 411 and 412 are capable of deflecting a signal light at an angle relatively larger than that of the optical deflecting element 411 in accordance with a variation of the drive voltage, when $V_1$ to $V_4$ having discrete values are supplied as mentioned above, the loss of the output signal light also shows a distribution indicated by $L_1$ to $L_4$ in FIG. 8A. Therefore, difficulty is experienced in performing the adjustment to the attenuation quantity of the output signal light, which can provide an accurate target output power, by only the control of the drive voltage to the optical deflecting elements 411 and 412.

As shown in FIG. 8B, the optical deflecting element 413 is capable of carrying out the sufficiently fine setting on the power loss quantity of a output signal light with respect to the resolution of a digital signal forming a control signal from the drive voltage control unit 51a. That is, as shown in FIG. 8B, the optical deflecting element 413 has a width of a controlled variable (difference between $V_{small}$ and $V_{s1}$, between $V_{s1}$ and $V_{s2}$, between $V_{s2}$ and $V_{s3}$ or between $V_{s3}$ and $V_{s4}$) sufficiently larger than a width of a controlled variable (for example, width between $V_1$ and $V_2$) for the optical deflecting elements 411 and 412, and increases the loss quantity by $L_{11}$ to $L_{14}$ from the loss quantity corresponding to $V_{small}$.

That is, owing to the cooperation between the optical deflecting elements 411 to 413 constituting the output side deflecting units 41 to 4n, the loss quantities $L_0$ to $L_4$ due to the optical deflecting elements 411 and 412 and the loss quantities $L_{11}$ to $L_{14}$ due to the optical deflecting element 413 are combined with each other, thereby finely setting the attenuation quantity of the output signal light in a range between the loss quantities $L_0$ and $L_4$.

With respect to the adjustment width (that is, attenuation resolution) of the power loss quantity (attenuation width of signal light) in the optical deflecting element 413, the adjustment width of the aforesaid attenuation quantity due to the optical deflecting elements 411 and 412 can properly be equally divided in accordance with the accuracy for the acquisition of the target power of the output signal light. In this embodiment, the adjustment width of the attenuation quantity due to the optical deflecting elements 411 and 412 is equally divided into five sections.

[A6] About Function for Suppression of Crosstalk at Port Switching by Optical Switch Module 3

In the optical switch apparatus 1 according to this embodiment, when a request takes place for the switching of the optical route set, the drive voltage control unit 51a of the control circuit unit 5 changes the drive voltage which has been supplied to the input side deflecting units 31 to 3n and the output side deflecting unit 41 to 4n which form the optical route which is the object of switching.

For example, in the case of switching the connection-accepting side with respect to the input side optical fiber 11 from the output side optical fiber 21 to the output side optical fiber 2n, the drive voltage to the optical deflecting element 311 constituting the input side deflecting unit 31 is increased so that the signal light outputted from the input side deflecting unit 31 is inputted to the output side deflecting unit 4n. At this time, in the processing of increasing the drive voltage to be applied to the optical deflecting element 311 of the input side deflecting unit 31, there is a possibility that the signal light outputted from the input side deflecting unit 31 is temporarily inputted to the output side deflecting units 42 to 4(n-1) disposed between the output side deflecting units 41 and 4n.

In this case, the signal light in the middle of the switching leaks into the other output side optical fibers 22 to 2(n-1), which causes the occurrence of crosstalk in the other output side optical fibers 22 to 2(n-1).

In the optical switch apparatus 1 according to this embodiment, the upstream-side optical deflecting elements 411 and 412 of the output side deflecting units corresponding to the output ports #21 to #2n through which the optical route for the propagation of the signal light from the input ports #11 to #1n is not set are made so as to cut off the leakage of the signal light from each of the input side deflecting units 31 to 3n into the output side.

Thus, in a case in which, as mentioned above, the route switching on the signal light from the input side optical fiber 11 is made from the output side optical fiber 21 to the output side optical fiber 2n and the signal light is outputted thereto, of the output side deflecting units 42 to 4(n-1) between the output side deflecting unit 41 before switching and the output side deflecting unit 4n after the switching, with respect to the output side deflecting unit through which an optical route is not set (which does not constitute an optical route), the drive voltage to the upstream-side optical deflecting elements is set so that the signal from the input side optical fiber 11 does not leak into the corresponding output side optical fibers 22 to 2(n-1).

Figure 9:
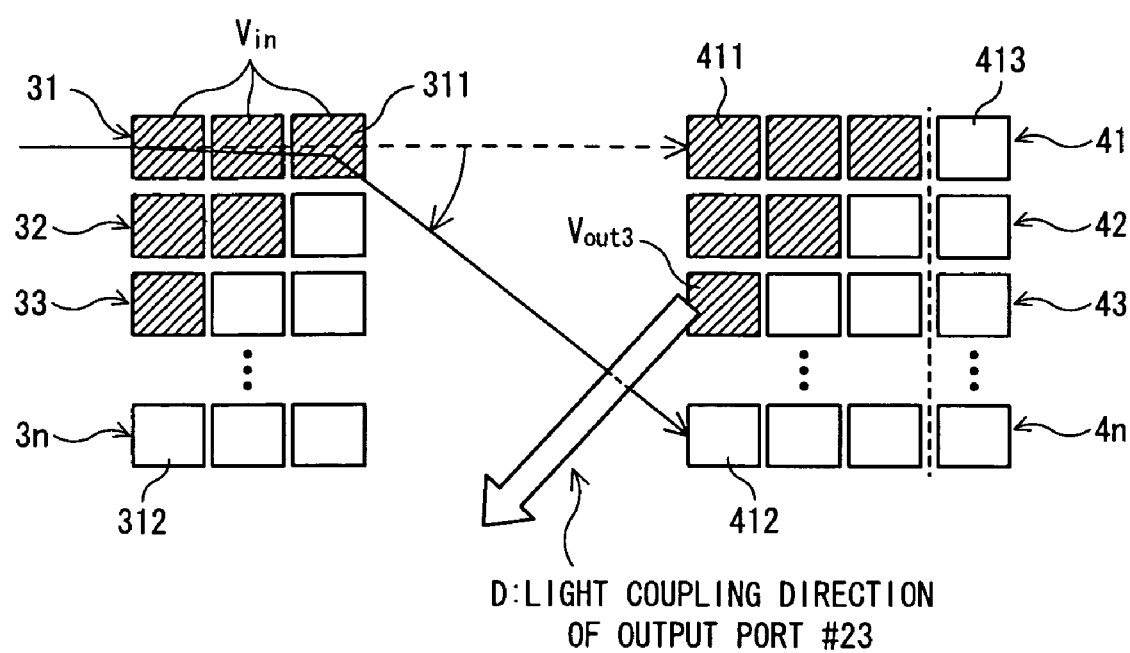
FIG. 9 shows a configuration for preventing a crosstalk of an optical signal in this embodiment.

For example, in a case in which, as shown in FIG. 9, the signal light from the input side deflecting unit 31 is inputted to the optical deflecting element 411 of the output deflecting unit 43, the control circuit unit 5 controls the drive voltage to the optical deflecting element 411 so that this signal light is reflected in a direction D. Thus, with respect to the output side deflecting units 41 to 4n which do not constitute an optical route (path), the drive voltage is set so that the deflection is made in a wrong direction to prevent the coupling to the output side optical fibers 21 to 2n.

Figure 10:
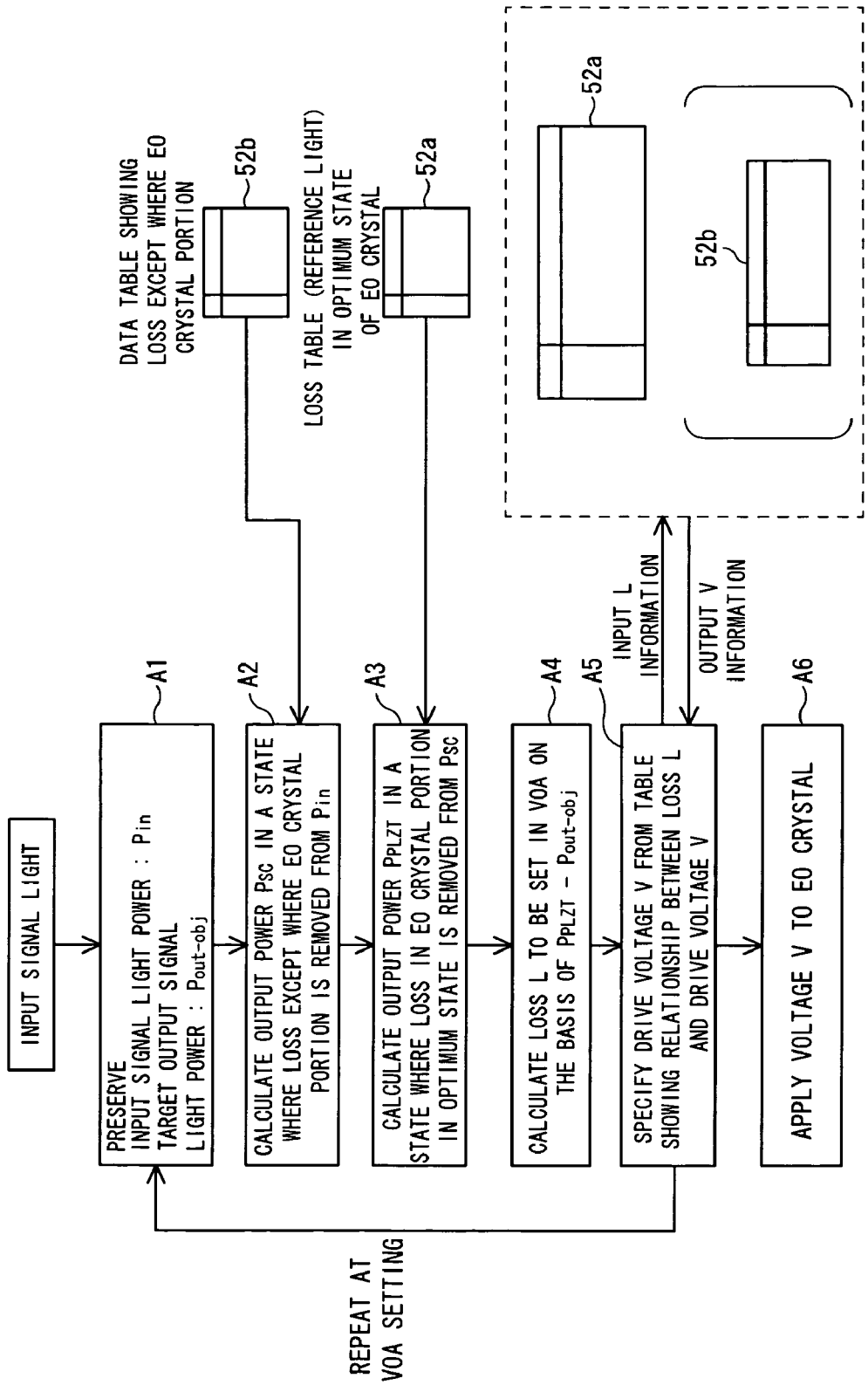
FIG. 10 is a flow chart useful for explaining a mode for the supply of a drive voltage signal corresponding to an optical route and target output power to be set in a switch module.

[A7] Description of Mode of Supplying Drive Voltage According to Optical Route to be Set in Switch Module 3 and Target Output Power Furthermore, referring to the flow chart of FIG. 10, a description will be given hereinbelow of a mode of supplying a drive voltage signal according to the optical route to be set in the switch module 3 and the target output power.

Upon receipt of control information for setting an optical route, the drive voltage control unit 51a supplies a drive voltage to the input side deflecting units 31 to 3n and the output side deflecting units 41 to 4n corresponding to an optical route to be set on the basis of this control information. At this time, through the adjustment of the drive voltage to the output side deflecting units 41 to 4n, the output signal light is properly attenuated to reach the desired output power.

In this case, it is considered that the attenuation quantity for bringing the output signal light to the desired output power varies according to optical route to be set. Therefore, for setting the drive voltage for setting the optical route, the setting is made in consideration of the difference in attenuation quantity for obtaining the desired output power according to this optical route.

Concretely, for setting the optical route in the switch module 3, an input signal light power Pin and a target output signal light power Pout-obj are preserved in the control information storing unit 52 (step A1). Moreover, the drive voltage control unit 51a derives an attenuation quantity (value) for controlling the output signal light power, coupled to an output side optical fiber, to the target output power on the basis of these power information and the contents stored in the first and second loss information storing units 52a and 52b.

Figure 11:
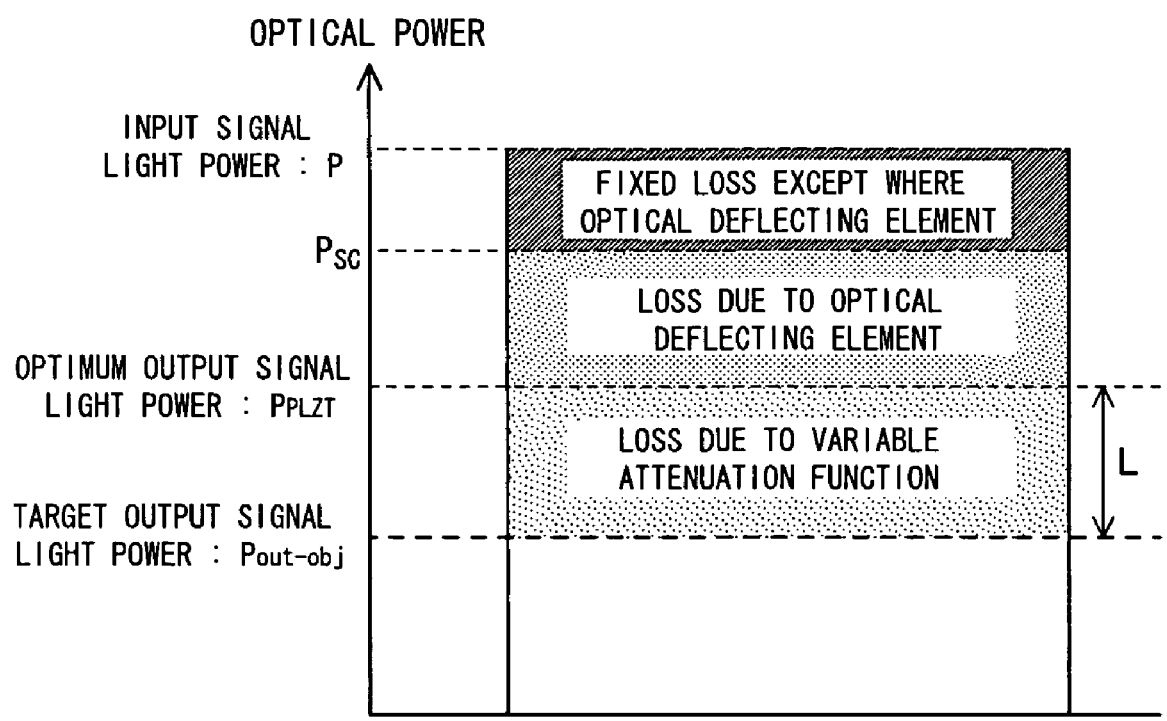
FIG. 11 is an illustration useful for explaining the lead-out of a drive voltage signal corresponding to an optical route and target output power to be set in a switch module.

That is, a fixed loss value in the optical switch apparatus 1 which does not depend upon the route switched portion undergoing the switching operation by the optical deflecting elements 311, 312 and 411 to 413 forming the optical route is read out from the second loss information storing unit 52b, and this loss value is subtracted from the input signal light power $P_{in}$, thus obtaining an output power $P_{SC}$ with the loss except where the optical deflecting elements 311, 312 and 411 to 413 being removed from $P_{in}$ (step A2, see FIG. 11).

Following this, the loss value information depending upon the route switched portion undergoing the switching operation by the optical deflecting elements 311, 312 and 411 to 413 with respect to the optical route to be set is read out from the first loss information storing unit 52a, and this value is subtracted from $P_{SC}$, thus obtaining an output power $P_{PLZT}$ in a state where the loss in the optical deflecting element portion in a coupling efficiency optimized condition (see FIG. 7A) is removed from PSC (step A3, see FIG. 11).

In addition, the target output signal light power $P_{out\text{-}obj}$ preserved in the control information storing unit 52 is subtracted from the obtained value $P_{PLZT}$, thereby obtaining an attenuation quantity (value) L due to the adjustment of the drive voltages in the output side deflecting units 41 to 4n related to the optical route to be set (step A4, see FIG. 11).

When the attenuation quantity L taken for the target output power value is calculated in this way, the drive voltage control unit 51a makes reference to the first loss information storing unit 52a to derive the drive voltage information for obtaining the attenuation quantity L in this optical route (step A5), and adjusts the drive voltage value to obtain a target output power from the drive voltage value which minimizes the loss quantity and outputs the adjusted drive voltage information as a control signal to the drive voltage supplying unit 54 (step A6).

In this way, the drive voltage is supplied through the drive voltage supplying unit 54 to each of the input side deflecting units 31 to 3n and the output side deflecting units 41 to 4n. Moreover, the signal light inputted through each of the input side optical fibers 11 to 1n is outputted from each of the output side optical fibers 21 to 2n related to the set optical route in a state where its output power is controlled to the target output power.

[A8] About Correction of Drive Voltage when Reference Light and Signal Light are Different in Wavelength Range In a case in which light in a wavelength range different from that of signal light is used as aforesaid reference light and the loss characteristic relative to the drive voltage is different in the switch module 3, for the optical route setting control and the variable attenuation control with respect to the signal light, there is a need to reflect the characteristic on the reference light, measured as mentioned above, onto the characteristic on the signal light.

For this reason, in the optical switch apparatus 1 according to this embodiment, the relationship in association between the monitored optical power characteristic of the reference light and the optical power characteristic of the signal light is also stored as the contents of the second loss characteristic storing unit 52b of the control information storing unit 52, and when making reference to the contents of the control information storing unit 52, the drive voltage control unit 51a can utilize this association relationship stored in the second loss characteristic storing unit 52b for correcting the drive voltage to be supplied to the optical deflecting elements constituting the input side deflecting units 31 to 3n and the output side deflecting units 41 to 4n.

Concretely, in a case in which light in L band is used as reference light, the loss quantity relative to a drive voltage variation with respect to the output side deflecting units 41 to 4n shows a characteristic indicated by STD in FIG. 12A, and when light in C band is used as signal light, the loss quantity relative to a drive voltage variation with respect to the output side deflecting units 41 to 4n shows a characteristic indicated by SIG in FIG. 12A.

In this case, with respect to STD and SIG, the difference $\Delta V_{max}$ between the drive voltage values which minimize the loss is stored in advance as shown in FIG. 12A, and a curve magnification (VL curve magnification) $P_{AB}$ of the voltage loss characteristic shown in FIG. 12B is stored in advance, thereby enabling the above-mentioned correction on the drive voltage.

In this case, $P_{AB}$ is obtainable from the ratio of drive voltage values (ratio $P_{AB}$ of signal light to reference light) with respect to a maximum attenuation controlled variable (−XdB from a point at which the loss becomes at a minimum) in a case in which, with respect to STD and SIG in FIG. 12A, the graph STD of the reference light is shifted in parallel by $\Delta V_{max}$ with respect to SIG so that the minimum points in loss meet each other as shown in FIG.12B.

Moreover, when the attenuation quantity L which is an object of the aforesaid variable attenuation control is obtained (step A4 in FIG. 10), the drive voltage control unit 51a derives reference light handling drive voltage information $V_{outy\text{-}std}$ (L) corresponding to that attenuation quantity L from the variation-state characteristic storing unit 52a-2 of the first loss characteristic storing unit 52a, and takes out the aforesaid $\Delta V_{max}$ and $P_{AB}$ from the second loss characteristic storing unit 52b, thereby making a correction according to the following equation (1) on the basis of these values and a reference light handling optimum voltage $V_{out\text{-}max}$ ($V_{out\text{-}obj}$) to the output side deflecting units 41 to 4n from the optimum-state characteristic storing unit 52a-1 to obtain the corrected drive voltage information $V_{outy\text{-}sig}$ (L).

Incidentally, since it is considered that the aforesaid $\Delta V_{max}$ and $P_{AB}$ vary for each optical route to be set, as in the case of the aforesaid optimum-state characteristic storing unit 52a-1 and the variation-state characteristic storing unit 52a-2, it is also appropriate that a different value is set for each optical route. For expressing the fact that the equation (1) is for obtaining the drive voltage information in the case of the connection between the input port #1i and the output port #2j, subscripts (i j) are assigned in the equation (1).

$$V_{outy\text{-}sig(i\,j)}(L)=(V_{out\text{-}max(i\,j)}-\Delta V_{max(i\,j)})+P_{AB}\times(V_{outy\text{-}std(i\,j)}(L)-V_{out\text{-}max(i\,j)}) \quad (1)$$

[A9] About Updating of Control Information Storing Unit 52 by Updating Control Unit 51b Furthermore, a description will be given hereinbelow of the updating control in the updating control unit 51b with respect to the contents stored in the first loss characteristic storing unit 52a of the control information storing unit 52.

Between the input ports #11 to #1n and the output ports #21 to #2n, as shown in FIG. 2, the updating control unit 51b updates the control information on an optical route(s) between the relevant input ports #11 to #1n and output ports #21 to #2n as follows by measuring the output characteristic of the reference light, outputted from the reference light source 61 serving as a reference light outputting unit, with respect to the switch module 3 through the use of the output power monitors 62-1 to 62-n serving as a reference light monitor unit.

Figure 13B:
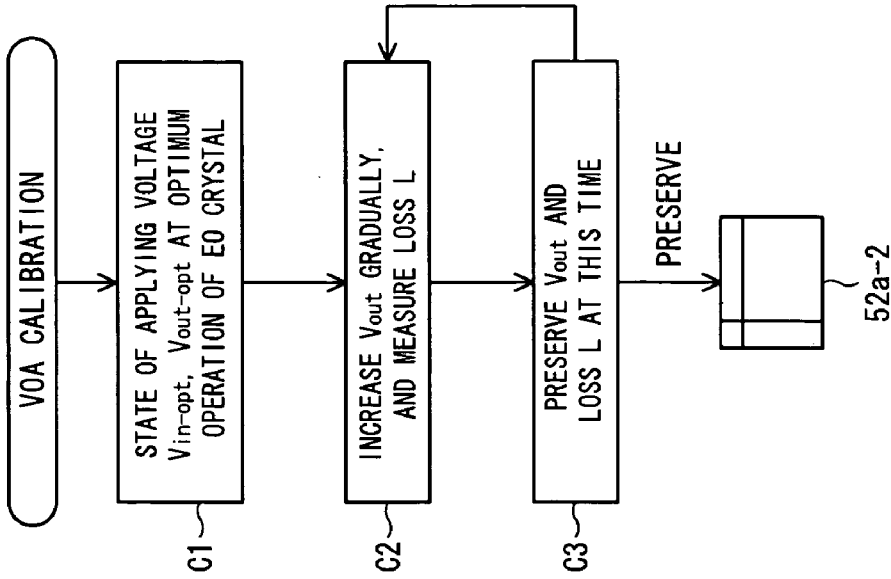
FIGS. 13A and 13B are flow charts useful for explaining the updating of a control information storing unit by an updating control unit.
Figure 13A:
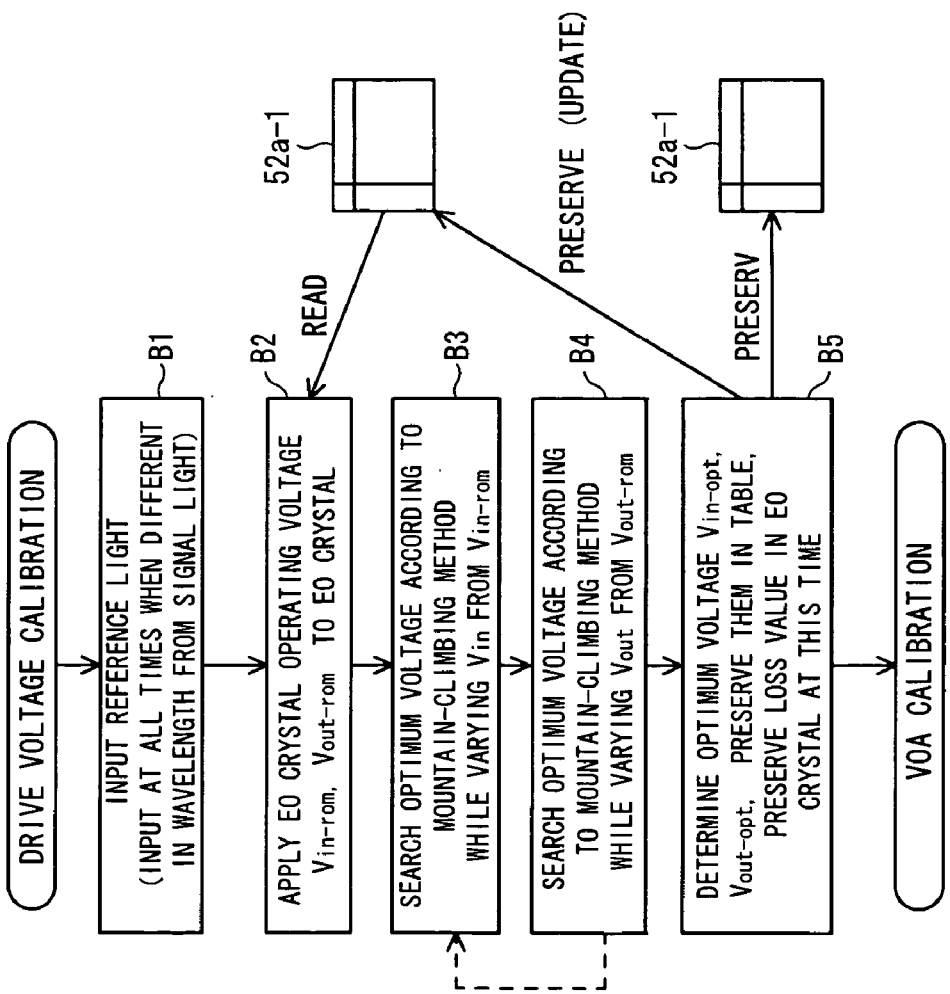

First, the updating is made as indicated by steps B1 to B5 in FIG. 13A. That is, the updating is made on the drive voltage information stored in the optimum-state characteristic storing unit 52a-1 and the value of a drive voltage for optimizing the optimum drive voltage for an optical route which is an object of updating (see the power $P_{PLZT}$ in FIG. 11) (drive voltage calibration).

That is, the reference light (in this case, light having a wavelength different from that of the signal light) is outputted from the reference light source 61 and supplied through the optical coupler 63 and the wavelength couplers 64-1 to 64-n to the input side deflecting units 31 to 3n (step B1). In the switch module 3, a drive voltage signal is supplied to each of the input side deflecting unit 3i and the output side deflecting unit 4j (i, j:1 to n) forming an optical route which is an object of updating (i.e., control information to be updated) in the control circuit unit 5 (step B2), with the inputted reference light being outputted through the output side deflecting unit 4j to the output side optical fiber 2j.

In the updating control unit 51b of the control information storing unit 52, the drive voltage at this time corresponds to the drive voltage information on the optical route passing through the input/output ports #1i and #2j, which is stored in the optimum-state characteristic storing unit 52a-1 in the phase before the updating. That is, to the input side deflecting unit 3j, there is supplied a drive voltage corresponding to the drive voltage information ($V_{in\text{-}rom}$) read out from the optimum-state characteristic storing unit 52a-1 while, to the output side deflecting unit 4j, there is supplied a drive voltage corresponding to a voltage ($V_{out\text{-}rom}$) read out from the optimum-state characteristic storing unit 52a-1.

Moreover, the updating control unit 51a varies the drive voltage to be supplied to the input side deflecting unit 3i to search an optimum voltage (voltage showing the highest coupling efficiency) according to, for example, a mountain-climbing method for the updating (step B3). Incidentally, in this case, it is also acceptable to vary the drive voltage at every optical deflecting elements 311 and 312 differentiable among deflecting direction. At this time, the search is made on the condition that the same drive voltage is supplied to the optical deflecting elements made to conduct the deflection in the same direction.

Subsequently, for the updating, the search of the optimum voltage (voltage showing the highest coupling efficiency) is made according to, for example, a mountain-climbing method while varying the drive voltage to be supplied to the output side deflecting unit 4j (step B4). In this case, the drive voltage for the coarse adjustment is varied with respect to the coarse-adjustment elements 411 and 412, while the drive voltage for the fine adjustment is varied with respect to the fine-adjustment element 413. For the output side deflecting unit 4j, it is also appropriate that, along with the fine-adjustment element 413, the drive voltages are varied at every optical deflecting elements 411 and 412 differentiable among deflecting directions.

In this connection, considering that the optimum voltages to the input side deflecting unit 3i and the output side deflecting unit 4j vary due to the mutual setting thereof, the repeated setting can be made until the results of the search of the optimum voltages with respect to the input side deflecting unit 3i and the output side deflecting unit 4j reach a stable condition.

When the optimum voltages to the input side deflecting unit 3i and the output side deflecting unit 4j are found out in the aforesaid steps B3 and B4, this search results are determined as new optimum voltages $V_{in\text{-}opt}$ and $V_{out\text{-}opt}$, thus making the updating thereon as the contents to be stored in the optimum-state characteristic storing unit 52a-1. Moreover, the loss value to be obtained on the basis of the monitor result in the output power monitor 65-j at this time is stored in the optimum-state characteristic storing unit 52a-1 in a state associated with the optimum voltage (step B5). This loss value is calculated on the basis of the already known input power value and the output power monitor result.

If the optimum voltages to the input side deflecting unit 3i and the output side deflecting unit 4j are updated as mentioned above, then the control information for the variable attenuation control on the signal light outputted from the output side deflecting unit 4j to the output side optical fiber 2j, i.e., the contents of the variation-state characteristic storing unit 52a-2, are updated as indicated by steps C1 to C5 in FIG. 13B (VOA calibration).

That is, in a state where the optimum voltages $V_{in\text{-}opt}$ and $V_{out\text{-}opt}$ updated at the aforesaid drive voltage calibration are supplied to the input side deflecting unit 3i and the output side deflecting unit 4j, respectively (step C1), the value of the voltage to be supplied to the output side deflecting unit 4j is increased by unit quantity so that the loss value is measured through the use of the output monitor result in each case (step C2). Moreover, this measurement value, together with the increased voltage value to the output side deflecting unit 4*j*, is stored in the variation-state characteristic storing unit 52*a*-2 (step C3).

With respect to the aforesaid loss value measurement result to the drive voltage variation, the measurement of the loss value corresponding to the increase in drive voltage by the unit quantity is repeatedly made on the basis of the estimated dynamic range of the variable attenuation control until it becomes a given increasing range relative to the optimum voltage $V_{out-opt}$. In this case, although the measurement is made in the increasing direction as the direction of the voltage control at the variable attenuation control, it is also acceptable that the measurement is made in a decreasing direction.

At this time, the aforesaid variation of the drive voltage by the unit quantity is successively stored as a variation of the loss quantity relative to the increase of the drive voltage by the unit quantity with respect to the optical deflecting element 413 serving as a fine-adjustment element and, whenever the drive voltage to the optical deflecting element 413 reaches an upper limit, the drive voltage to each of the coarse-adjustment elements 411 and 412 is increased by a unit quantity (see FIG. 8).

When the contents of the optimum-state characteristic storing unit 52*a*-1 and the variation-state characteristic storing unit 52*a*-2 are updated in this way, the drive voltage control unit 51*a* can makes reference to the updated first loss characteristic storing unit 52*a* and the second loss characteristic storing unit 52*b* to assign the drive voltage information to the drive voltage supplying unit 54 for setting an optical route for inputted signal light and further for controlling output signal light to a target output power.

Therefore, the reference light source 61, the reference light power monitors 62-1 to 62-*n*, the optical coupler 63, the wavelength couplers 64-1 to 64-*n*, 65-1 to 65-*n* and the updating control unit 51*b* constitute the updating unit which supplies reference light to a pair of input side deflecting unit 3*i* and output side deflecting unit 4*j* related to an optical route which is an object of updating with respect to the control information in the control information storing unit 52 for updating the contents of the control information storing unit 52 related to the updating object optical route on the basis of the input and output power characteristic of the reference light passing through the pair of input side deflecting unit 3*i* and output side deflecting unit 4*j*.

[A10] Effects

Figure 14:
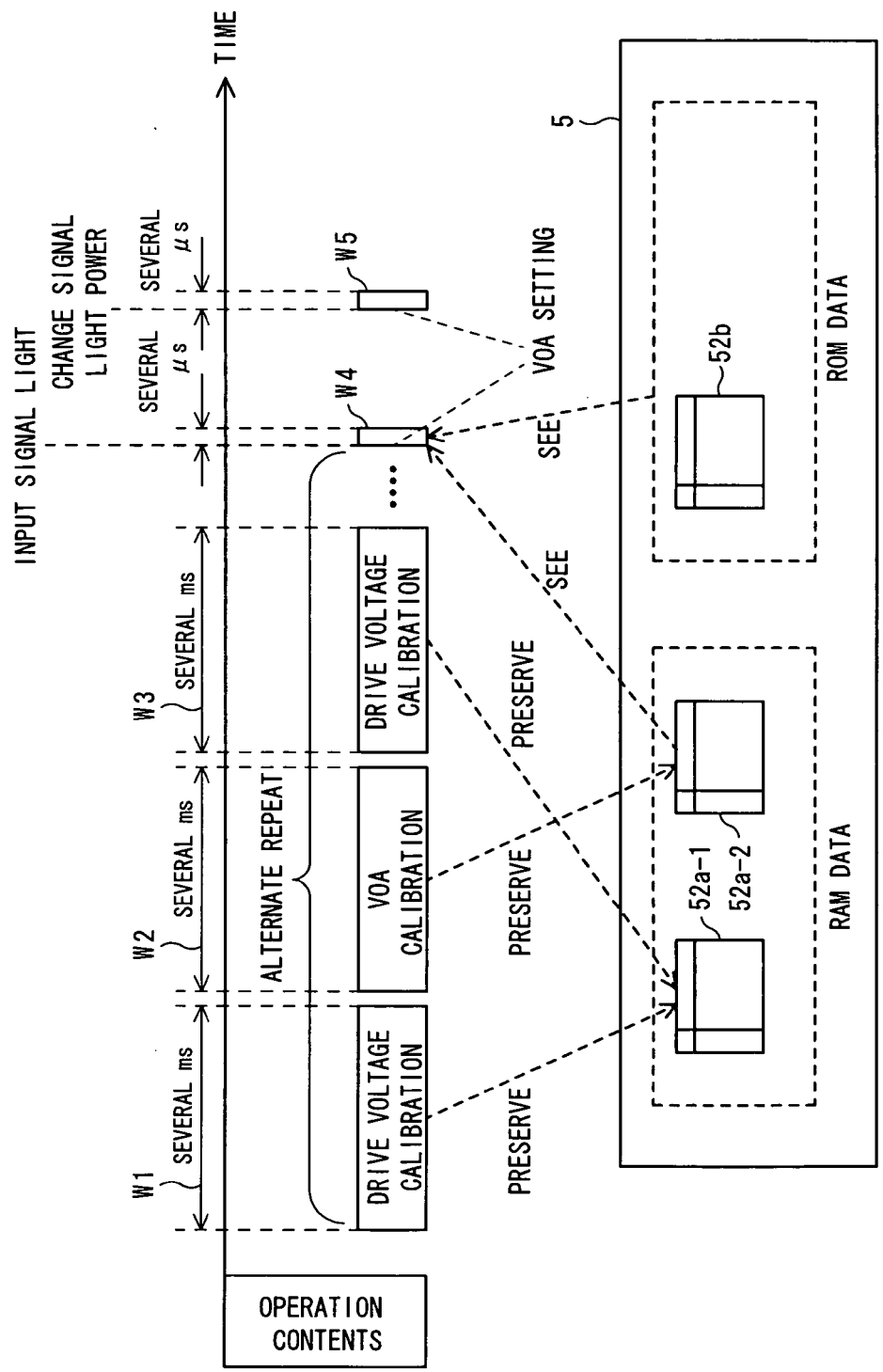
FIG. 14 is an illustration useful for explaining a schedule of updating processing in the control information storing unit by the updating control unit.

In the optical switch apparatus 1 according to this embodiment, the signal lights inputted from the input side optical fibers 11 to 1*n* are outputted through the output side optical fibers 21 to 2*n* of an optical route set. At this time, through the optical route setting control and the variable attenuation control for the target optical power in the control circuit unit 5, a drive voltage for the optical route setting control and the variable attenuation control can be supplied to the corresponding one of the optical deflecting elements 311, 312 and 411 to 413 within a response time of about several μs from the signal light input time. This also applies to the case of a change of the target signal light power (see W4 and W5 in FIG. 14).

In a case in which a wavelength different from the signal light wavelength is selected as a reference light from the reference light source 61, it is possible to concurrently carry out the updating control on the control information storing unit 52 in the updating control unit 51*b* while implementing the above-mentioned control through the use of the drive voltage control unit 51*a* of the control circuit unit 5.

Also in a case in which light having the same wavelength as the signal light wavelength is selected as the reference light from the reference light source 61, by supplying the reference light to the input side deflecting unit 3*i* and the output side deflecting unit 4*j* related to the input port #1*i* and the output port #2*j* which do not organize an optical route, it is possible to update the information on the drive voltages to these input/output deflecting units 3*i* and 4*j* through the aforesaid drive voltage calibration (steps B1 to B5 in FIG. 13A) and the aforesaid VOA calibration (steps C1 to C3 in FIG. 13B).

Looking at the updating control on an optical route which is not set, although the aforesaid drive voltage calibration and VOA calibration can alternately be made within a processing time of several ms (W1 to W4), when a signal light is once inputted, the optical route setting control is executed within the aforesaid response time through the drive voltage control to be implemented on the basis of the contents of the control information storing unit 52 updated through the earlier updating control processing.

That is, since the control such as feedback control does not work in the process of setting an optical route undergoing the output light power control as signal light is inputted, the response time is shortened, thus eliminating the fluctuation of the optical power through the response in a time dimension shorter than milliseconds.

As described above, with the optical switch apparatus 1 according to this embodiment, in the switch module 3, the route switching for frame signal lights inputted through various paths can be made while eliminating the dispersion of the output power value.

In addition, of the input side deflecting units 31 to 3*n*, the input side deflecting unit 31 to 3*n* disposed to deflect a signal light from the input port #11 to #1*n* closer to an end position has more optical deflecting elements each showing a deflection characteristic in a direction opposite to the end position while, of the output side deflecting units 41 to 4*n*, the output side deflecting unit 41 to 4*n* corresponding to the output port closer to an end position has more optical deflecting elements each showing a deflection characteristic in a direction opposite to the end position, which can make constant the maximum voltage to be supplied to the optical deflecting elements irrespective of the disposition position and which can simplify the control on the input side deflecting units 31 to 3*n* and the output side deflecting units 41 to 4*n*.

Still additionally, the employment of the coarse-adjustment elements 411, 412 and the fine-adjustment element 413 enables the attenuation quantity of output signal light to be finely set without considerably increasing the dynamic range of a digital signal needed as a controlled variable.

Yet additionally, the upstream-side optical deflecting elements 411 and 412 of the output side deflecting units 41 to 4*n* corresponding to the output ports which do not constitute an optical route through which signal light from the input ports #11 to #1*n* propagates can be constructed so as to cut off the leakage of the signal light from each of the input side deflecting units 31 to 3*n* into the output side, which can suppress the crosstalk to the other output side optical fibers 22 to 1(*n*-1) due to the signal light in the middle of the switching.

[B] Others

It should be understood that the present invention is not limited to the above-described embodiments, and that it is intended to cover all changes and modifications of the embodiments of the invention herein which do not constitute departures from the spirit and scope of the invention.

Moreover, the disclosure of the above-described embodiments enables the manufacturing of the apparatus according to the present invention.

What is claimed is:

1. An optical switch apparatus designed to deflect signal light from one of a plurality of input ports for switching and outputting to one of a plurality of output ports, the optical switch apparatus comprising:

input side deflecting units deflecting said signal light from said input ports at an angle corresponding to a position of said output port forming an output destination, said input side deflecting units being disposed in corresponding relation to said plurality of input ports; and output side deflecting units deflecting the signal light from said input side deflecting units at an angle corresponding to a signal light guiding direction to said output ports and output them to said output ports, said output side deflecting units are disposed in corresponding relation to said plurality of output ports, wherein each of said input side deflecting units and each of said output side deflecting units are constructed in a manner such that a plurality of optical deflecting elements, each for deflecting signal light through the use of an electric field applied, are arranged in a cascade fashion such that, of said input side deflecting units, said input side deflecting unit disposed to deflect signal light from an input port closer to the input side has more optical deflecting elements each showing a deflection characteristic in a direction opposite to the input side, and of said output side deflecting units, said output side deflecting unit corresponding to an output port closer to the output side has more optical deflecting elements each showing a deflection characteristic in a direction opposite to the output side, and said optical deflecting element constituting said input side deflecting unit or said output side deflecting unit is made to variably adjust an optical coupling efficiency between said output side deflecting unit and said output port, thereby adjusting a level of signal light to be outputted from said output side deflecting unit to said output port.

2. The optical switch apparatus according to claim 1, further comprising:

a control information storing unit for storing control information for setting an optical route through which signal light propagates between one of said plurality of input ports and one of said plurality of output ports;

a drive voltage control unit for making reference to the contents of said control information storing unit to output a control signal for controlling a drive voltage to be supplied to said optical deflecting elements constituting said input side deflecting units and said output side deflecting units in accordance with said optical route to be set and a power value of output signal light to be set; and a drive voltage supplying unit for supplying said drive voltage controlled by said control signal from said drive voltage control unit.

3. The optical switch apparatus according to claim 1, wherein an optical deflecting element on the upstream side in said output side deflecting unit corresponding to an output port through which an optical route for propagating signal light from said input port is not set is constructed to cut off a leakage of signal light from each of said input side deflecting units to an output side.

4. The optical switch apparatus according to claim 1, wherein each of said optical deflecting elements constituting each of said input side deflecting units and each of said output side deflecting units includes a member having an electro-optic effect and an electrode unit for generating said electric field to deflect signal light inputted.

5. An optical switch apparatus designed to deflect signal light from one of a plurality of input ports for switching and outputting to one of a plurality of output ports, the optical switch apparatus comprising:

input side deflecting units deflecting said signal light from said input ports at an angle corresponding to a position of said output port forming an output destination, said input side deflecting units being disposed in corresponding relation to said plurality of input ports;

output side deflecting units deflecting the signal light from said input side deflecting units at an angle corresponding to a signal light guiding direction to said output ports and output them to said output ports, said output side deflecting units being disposed in corresponding relation to said plurality of output ports;

a control information storing unit for storing control information for setting an optical route through which signal light propagates between one of said plurality of input ports and one of said plurality of output ports;

a drive voltage control unit for making reference to the contents of said control information storing unit to output a control signal for controlling a drive voltage to be supplied to said optical deflecting elements constituting said input side deflecting units and said output side deflecting units in accordance with said optical route to be set and a power value of output signal light to be set; and a drive voltage supplying unit for supplying said drive voltage controlled by said control signal from said drive voltage control unit, wherein each of said input side deflecting units and each of said output side deflecting units are constructed in a manner such that a plurality of optical deflecting elements, each for deflecting signal light through the use of an electric field applied, are arranged in a cascade fashion, said optical deflecting element constituting said input side deflecting unit or said output side deflecting unit is made to variably adjust an optical coupling efficiency between said output side deflecting unit and said output port, thereby adjusting a level of signal light to be outputted from said output side deflecting unit to said output port, and wherein said control information storing unit includes:

a first loss characteristic storing unit for preserving a drive voltage to be supplied to said optical deflecting elements constituting said input side deflecting units and said output side deflecting units according to said optical route to be set and a loss characteristic of signal light to be outputted from an output port forming said optical route; and a second loss characteristic storing unit for storing a fixed loss characteristic of signal light which does not depend on said optical route to be set.

6. An optical switch apparatus designed to deflect signal light from one of a plurality of input ports for switching and outputting to one of a plurality of output ports, the optical switch apparatus comprising:

input side deflecting units deflecting said signal light from said input ports at an angle corresponding to a position of said output port forming an output destination, said input side deflecting units being disposed in corresponding relation to said plurality of input ports;

output side deflecting units deflecting the signal light from said input side deflecting units at an angle corresponding to a signal light guiding direction to said output ports and output them to said output ports, said output side deflecting units being disposed in corresponding relation to said plurality of output ports;

a control information storing unit for storing control information for setting an optical route through which signal light propagates between one of said plurality of input ports and one of said plurality of output ports;

a drive voltage control unit for making reference to the contents of said control information storing unit to output a control signal for controlling a drive voltage to be supplied to said optical deflecting elements constituting said input side deflecting units and said output side deflecting units in accordance with said optical route to be set and a power value of output signal light to be set;

a drive voltage supplying unit for supplying said drive voltage controlled by said control signal from said drive voltage control unit; and an updating unit for applying a reference light to a pair of input side deflecting unit and output side deflecting unit in an optical route which is an object of updating with respect to control information in said control information storing unit to update the contents of said control information storing unit on the updating object optical route on the basis of characteristics of input and output power of said reference light passing through said pair of input side deflecting unit and output side deflecting unit, wherein each of said input side deflecting units and each of said output side deflecting units are constructed in a manner such that a plurality of optical deflecting elements, each for deflecting signal light through the use of an electric field applied, are arranged in a cascade fashion, and said optical deflecting element constituting said input side deflecting unit or said output side deflecting unit is made to variably adjust an optical coupling efficiency between said output side deflecting unit and said output port, thereby adjusting a level of signal light to be outputted from said output side deflecting unit to said output port.

7. The optical switch apparatus according to claim 6, wherein said updating unit includes:

a reference light outputting unit for outputting said reference light to said input side deflecting unit constituting said optical route which is the object of updating;

a reference light monitoring unit for monitoring an output power characteristic from said output side deflecting unit constituting said updating object optical route; and an updating control unit for controlling the updating of control information on said updating object optical route in said control information storing unit on the basis of a result of the monitor from said reference light monitoring unit.

8. The optical switch apparatus according to claim 7, wherein said reference light outputting unit is made to output, as said reference light, light in a wavelength range other than a wavelength of said signal light to said plurality of input side deflecting units.

9. The optical switch apparatus according to claim 7, wherein said reference light outputting unit sets light in a wavelength range of said signal light as said reference light and conducts said reference light to a route serving as said updating object optical route constituting a pair of input side deflecting unit and output side deflecting unit which are not set as an optical route for said signal light.

10. An optical switch apparatus designed to deflect signal light from one of a plurality of input ports for switching and outputting to one of a plurality of output ports, the optical switch apparatus comprising:

input side deflecting units deflecting said signal light from said input ports at an angle corresponding to a position of said output port forming an output destination, said input side deflecting units being disposed in corresponding relation to said plurality of input ports; and output side deflecting units deflecting the signal light from said input side deflecting units at an angle corresponding to a signal light guiding direction to said output ports and output them to said output ports, said output side deflecting units being disposed in corresponding relation to said plurality of output ports, wherein each of said input side deflecting units and each of said output side deflecting units are constructed in a manner such that a plurality of optical deflecting elements, each for deflecting signal light through the use of an electric field applied, are arranged in a cascade fashion, said optical deflecting element constituting said input side deflecting unit or said output side deflecting unit is made to variably adjust an optical coupling efficiency between said output side deflecting unit and said output port, thereby adjusting a level of signal light to be outputted from said output side deflecting unit to said output port, and for variably adjusting a level of said signal light said output side deflecting unit outputs to said output port, said optical deflecting elements constituting each of said output side deflecting units are constructed as a level coarse-adjustment element for coarsely adjusting a level of signal light to be outputted to a corresponding output port and a level fine-adjustment element for finely adjusting the level of said signal light to be outputted to the corresponding output port in a latter stage of said level coarse-adjustment element, respectively.

11. The optical switch apparatus according to claim 10, further comprising:

a control information storing unit for storing control information for setting an optical route through which signal light propagates between said plurality of input ports and said plurality of output ports;

a drive voltage control unit for making reference to the contents of said control information storing unit to output a control signal for controlling a drive voltage to be supplied to said optical deflecting elements constituting said input side deflecting units and said output side deflecting units in accordance with said optical route to be set and a power value of output signal light to be set; and a drive voltage supplying unit for supplying said drive voltage controlled by said control signal from said drive voltage control unit, said drive voltage control unit being made to set drive voltage information for said level coarse-adjustment element and said level fine-adjustment element constituting said output side deflecting unit in said optical route on the basis of information stored in said control information storing unit for variably attenuating signal light outputted from an output port in said optical route to a target level.

12. An optical switch apparatus designed to deflect signal light from one of a plurality of input ports for switching and outputting to one of a plurality of output ports, the optical switch apparatus comprising:

input side deflecting units deflecting said signal light from said input ports at an angle corresponding to a position of said output port forming an output destination, said input side deflecting units being disposed in corresponding relation to said plurality of input ports; and output side deflecting units deflecting the signal light from said input side deflecting units at an angle corresponding to a signal light guiding direction to said output ports and output them to said output ports, said output side deflecting units being disposed in corresponding relation to said plurality of output ports, wherein each of said input side deflecting units and each of said output side deflecting units are constructed in a manner such that a plurality of optical deflecting elements, each for deflecting signal light through the use of an electric field applied, are arranged in a cascade fashion, said optical deflecting element constituting said input side deflecting unit or said output side deflecting unit is made to variably adjust an optical coupling efficiency between said output side deflecting unit and said output port, thereby adjusting a level of signal light to be outputted from said output side deflecting unit to said output port, of said input side deflecting units, said input side deflecting unit disposed to deflect signal light from an input port closer to an end position has more optical deflecting elements each showing a deflection characteristic in a direction opposite to the end position, and of said output side deflecting units, said output side deflecting unit corresponding to an output port closer to an end position has more optical deflecting elements each showing a deflection characteristic in a direction opposite to the end position, and of said plurality of input side deflecting units disposed, said input side deflecting unit closer to a right-side end position has more optical deflecting elements each showing a deflection characteristic in a left-side direction and said input side deflecting unit closer to a left-side end position has more optical deflecting elements each showing a deflection characteristic in a right-side direction and, of said output side deflecting units disposed, said output side deflecting unit closer to a right-side end position has more optical deflecting elements each showing a deflection characteristic in a left-side direction and said output side deflecting unit closer to a left-side end position has more optical deflecting elements each showing a deflection characteristic in a right-side direction.

13. An optical switch apparatus designed to deflect signal light from one of a plurality of parallel input ports for switching and outputting to one of a plurality of parallel output ports, the optical switch apparatus comprising:

a plurality of input side deflecting units disposed in parallel for each said plurality of input ports, each of said plurality of input side deflecting units being adapted to deflect signal light from said corresponding input port at an angle corresponding to a position of an output port forming an output destination, respectively; and a plurality of output side deflecting units disposed in parallel for each said plurality of output ports, each of said plurality of output side deflecting units being adapted to deflect signal light from one of said plurality of input side deflecting units at an angle corresponding to a signal light guiding direction of said corresponding output port and output said signal light to said correspond output port, respectively, wherein each of said input side deflecting units and each of said output side deflecting units are constructed such that a plurality of optical deflecting elements, each showing either a first deflection characteristic of deflecting signal light in the direction of a right side or a second deflection characteristic of deflecting signal light in the direction of a left side through the use of an electric field applied, are arranged in a cascade fashion, said input side deflecting unit disposed closer to a right-side end position in a parallel disposition with respect to a propagation direction of the signal light has more optical deflecting elements each showing the second deflection characteristic and less optical deflecting elements each showing the first deflection characteristic, said input side deflecting unit disposed closer to a left-side end position of the parallel disposition with respect to the propagation direction of the signal light has more optical deflecting elements each showing the first deflection characteristic and less optical deflecting elements each showing the second deflection characteristic, said output side deflecting unit disposed closer to a right-side end position in a parallel disposition with respect to a propagation direction of the signal light has more optical deflecting elements each showing the second deflection characteristic and less optical deflecting elements each showing the first deflection characteristic, and said output side deflecting unit disposed closer to a left-side end position in the parallel disposition with respect to the propagation direction of the signal light has more optical deflecting elements each showing the first deflection characteristic and less optical deflecting elements each showing the second deflection characteristic.

14. The optical switch apparatus according to claim 13, wherein an upstream-side optical deflecting element constituting said output side deflecting unit corresponding to an output port through which an optical route for propagating signal light from said input port is not set is constructed to cut off a leakage of signal light from each of said input side deflecting units to an output side.

15. The optical switch apparatus according to claim 13, wherein each of said optical deflecting elements constituting each of said input side deflecting units and each of said output side deflecting units includes a member having an electro-optic effect and an electrode unit for generating said electric field to deflect signal light inputted.

16. The optical switch apparatus according to claim 15, further comprising:

a control information storing unit for preserving control information for setting an optical route, through which signal light propagates between said plurality of input ports and said plurality of output ports, for each combination of said input ports and said output ports;

a drive voltage control unit for making reference to the contents of said control information storing unit to control a drive voltage to be supplied to said optical deflecting elements constituting said input side deflecting units and said output side deflecting units according to an optical route to be set; and a drive voltage supplying unit for supplying said drive voltage controlled by said drive voltage control unit.

17. The optical switch apparatus according to claim 16, wherein said drive voltage control unit controls a drive voltage to an upstream-side deflecting element constituting said output side deflecting unit corresponding to an output port, through which an optical route for propagating signal light from said input port is not set, so as to cut off a leakage of signal light from each of said input side deflecting units to an output side.

18. A method of updating control information stored in a control information storing unit of an optical switch apparatus including input side deflecting units deflecting said signal light from said input ports at an angle corresponding to a position of said output port forming an output destination, said input side deflecting units being disposed in corresponding relation to said plurality of input ports, output side deflecting units deflecting the signal light from said input side deflecting units at an angle corresponding to a signal light guiding direction to said output ports and output them to said output ports, said output side deflecting units being disposed in corresponding relation to said plurality of output ports, a control information storing unit for storing control information for setting an optical route through which signal light propagates between one of said plurality of input ports and one of said plurality of output ports, a drive voltage control unit for making reference to the contents of said control information storing unit to output a control signal for controlling a drive voltage to be supplied to said optical deflecting elements constituting said input side deflecting units and said output side deflecting units in accordance with said optical route to be set and a power value of output signal light to be set, and a drive voltage supplying unit for supplying said drive voltage controlled by said control signal from said drive voltage control unit, wherein each of said input side deflecting units and each of said output side deflecting units are constructed in a manner such that a plurality of optical deflecting elements, each for deflecting signal light through the use of an electric field applied, are arranged in a cascade fashion, and said optical deflecting element constituting said input side deflecting unit or said output side deflecting unit is made to variably adjust an optical coupling efficiency between said output side deflecting unit and said output port, thereby adjusting a level of signal light to be outputted from said output side deflecting unit to said output port, the method comprising:

supplying a drive voltage to a pair of input side deflecting unit and output side deflecting unit constituting an optical route which is an object of updating of said control information so that a reference light passes therethrough;

monitoring output power of said reference light passing through said pair of input side deflecting unit and output side deflecting unit; and updating the contents of said control information storing unit related to said optical route which is the object of updating on the basis of the relationship among a characteristic of input power of said reference light, a result of the monitor of said output power and said drive voltage supplied.

19. The control information updating method in the optical switch apparatus according to claim 18, wherein light in a wavelength range other than said signal light is used as said reference light.

20. The control information updating method in the optical switch apparatus according to claim 18, wherein the relationship in association between the monitored optical power characteristic of said reference light and an optical power characteristic of said signal light is stored in advance for each optical route and said drive voltage to be supplied to said optical deflecting elements constituting said input side deflecting units and said output side deflecting units is corrected, in making reference to the contents of said control information storing unit, through the use of the association relationship in said drive voltage control unit.

21. The control information updating method in the optical switch apparatus according to claim 18, wherein light in the same wavelength range as said signal light is used as said reference light and a path formed by a pair of input side deflecting unit and output side deflecting unit which are not set as an optical route for said signal light is set as an optical route which is the object of updating so that said reference light passes therethrough.

* * * * *

UNITED STATES PATENT AND TRADEMARK OFFICE
CERTIFICATE OF CORRECTION

| | | |
|---|---|---|
| PATENT NO. | : 7,308,168 B2 | Page 1 of 1 |
| APPLICATION NO. | : 11/194565 | |
| DATED | : December 11, 2007 | |
| INVENTOR(S) | : Yutaka Takita et al. | |

It is certified that error appears in the above-identified patent and that said Letters Patent is hereby corrected as shown below:

Col. 30, line 5, delete "right side" and insert --right-side--, therefor.

Col. 30, line 7, delete "left side" and insert --left-side--, therefor.

Signed and Sealed this

Sixth Day of May, 2008

JON W. DUDAS
*Director of the United States Patent and Trademark Office*